United States Patent
Raghuramu et al.

(10) Patent No.: US 11,601,445 B2
(45) Date of Patent: Mar. 7, 2023

(54) CLUSTERING ENHANCED ANALYSIS

(71) Applicant: FORESCOUT TECHNOLOGIES, INC., San Jose, CA (US)

(72) Inventors: Arun Raghuramu, Milpitas, CA (US); Aveek Kumar Das, Santa Clara, CA (US); Yang Zhang, Fremont, CA (US)

(73) Assignee: FORESCOUT TECHNOLOGIES, INC., San Jose, CA (US)

( * ) Notice: Subject to any disclaimer, the term of this patent is extended or adjusted under 35 U.S.C. 154(b) by 241 days.

(21) Appl. No.: 16/835,999

(22) Filed: Mar. 31, 2020

(65) Prior Publication Data
US 2021/0306354 A1   Sep. 30, 2021

(51) Int. Cl.
*H04L 9/40* (2022.01)
*G06N 20/00* (2019.01)

(52) U.S. Cl.
CPC ......... *H04L 63/1416* (2013.01); *G06N 20/00* (2019.01)

(58) Field of Classification Search
CPC .... G06K 9/6218; G06N 20/00; H04L 63/104; H04L 63/1416; H04L 63/1425; H04L 67/22; H04L 63/20
See application file for complete search history.

(56) References Cited

U.S. PATENT DOCUMENTS

| 2018/0217259 A1 | 8/2018 | Ando |
| 2018/0288063 A1 | 10/2018 | Koottayi et al. |
| 2019/0349391 A1* | 11/2019 | Elsner ................. H04L 63/1416 |
| 2020/0106797 A1* | 4/2020 | Christian ............ H04L 63/1483 |

FOREIGN PATENT DOCUMENTS

WO    2018/217259 A2    11/2018

OTHER PUBLICATIONS

Forescout Technologies, Inc.; International Preliminary Report on Patentability dated Sep. 29, 2022; International Patent Application No. PCT/US2021/023018 filed Mar. 18, 2021 (7 pages).

* cited by examiner

*Primary Examiner* — Olugbenga O Idowu
(74) *Attorney, Agent, or Firm* — Womble Bond Dickinson (US) LLP

(57) ABSTRACT

Systems, methods, and related technologies for clustering are described. Network traffic is accessed from a network and the network may be associated with a plurality of entities. Behavior associated with each entity of the plurality of entities may be determined. The behavior may be determined based one or more communications associated with each entity. A processing device may be used to determine one or more clusters of entities based on entities having similar behavior. A cluster may comprise one or more entities with similar behavior. One or more anomalies may be determined based on the one or more clusters and storing data associated with at least one of the one or more clusters and the one or more anomalies may be stored.

20 Claims, 8 Drawing Sheets

CLUSTERING ENHANCED ANALYSIS

TECHNICAL FIELD

Aspects and implementations of the present disclosure relate to network access, and more specifically, analysis of network communications, segmentation, and anomalies.

BACKGROUND

As technology advances, the number and variety of devices that are connected to communications networks are rapidly increasing. Each device may have its own respective vulnerabilities which may leave the network open to compromise or other risks. Preventing the spreading of an infection of a device or an attack through a network can be important for securing a communication network.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
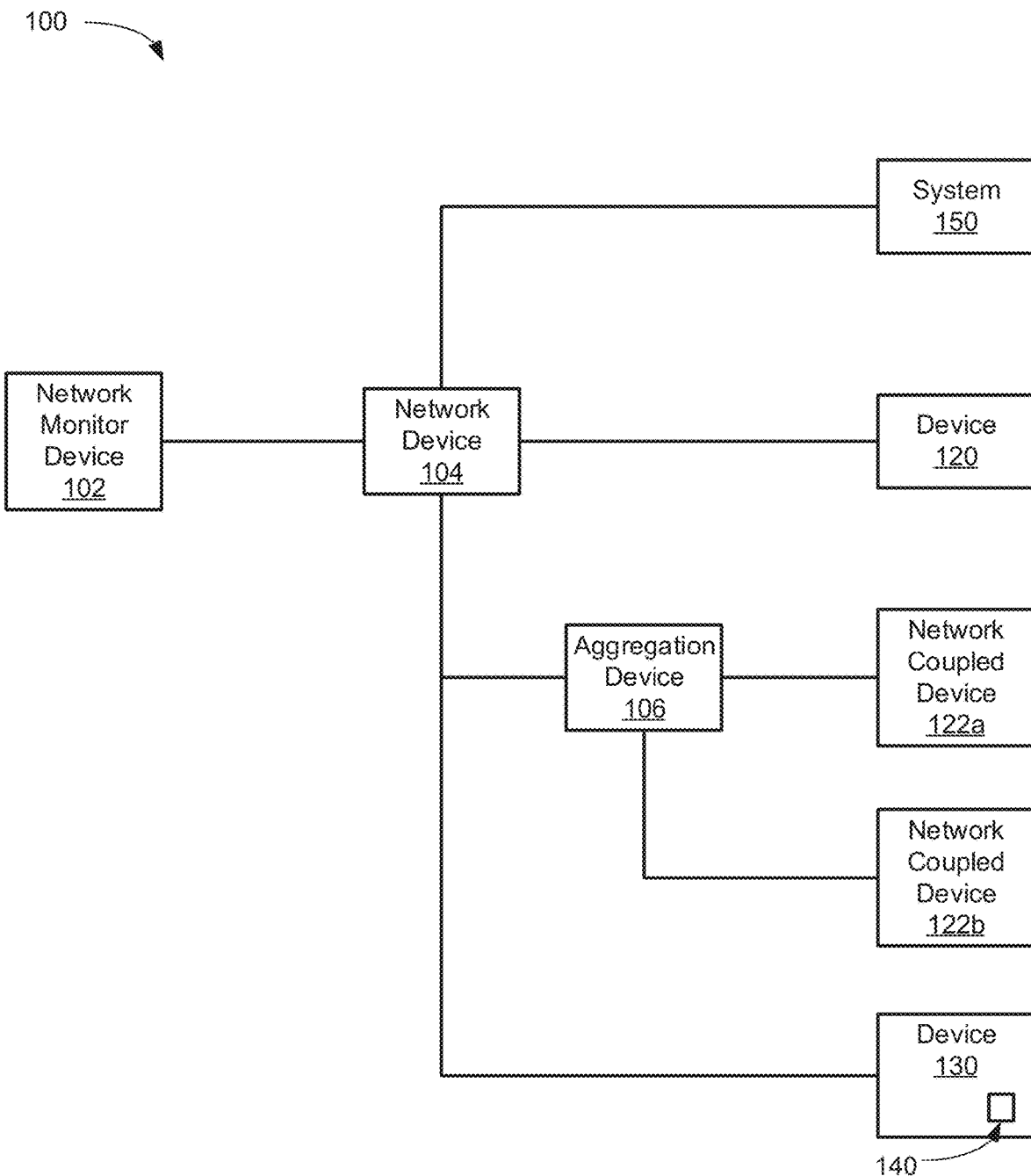
FIG. 1 depicts an illustrative communication network in accordance with one implementation of the present disclosure.

Aspects and implementations of the present disclosure are directed to traffic or behavior analysis of entities of a network including determining clusters of entities based on similarities of the entities. The systems and methods disclosed can be employed with respect to network security, among other fields. More particularly, it can be appreciated that devices with vulnerabilities are a significant and growing problem. At the same time, the proliferation of network-connected devices (e.g., internet of things (IoT) devices such as televisions, security cameras (IP cameras), wearable devices, medical devices, etc.) can make it difficult to effectively ensure that network security is maintained. Accordingly, described herein in various implementations are systems, methods, techniques, and related technologies, which allow for clustering of entities to enable determination of one or more anomalies, depicting or visualizing the clusters and one or more anomalies, and optionally performing actions to enable rapid response.

Network segmentation can be used to enforce security policies on a network, for instance in large and medium organizations, by restricting portions or areas of a network which a device can access or communicate with. Segmentation or "zoning" can provide effective controls to limit movement across the network (e.g., by a hacker or malicious software). Enforcement points including firewalls, routers, switches, cloud infrastructure, other network devices, etc., may be used to enforce segmentation on a network (and different address subnets may be used for each segment). Enforcement points may enforce segmentation by filtering or dropping packets according to the network segmentation policies/rules. The viability of a network segmentation project depends on the quality of visibility the organization has into its devices and the amount of work or labor involved in configuring network devices.

Historically, the traditional approach to network segmentation was based on creating defined static network zones or segments based on IP address or VLAN. The segments are configured in advance to allow creation and use of traffic filters, such as access control lists (ACLs), to handle broad access scenarios between network elements. The filters are typically implemented on firewalls. The board access scenarios between network elements includes any IP address in a zone to any IP address in another zone. This was the way that legacy static IPv4 networks were and are configured. The shift to IPv6 and exponential growth in the number of devices across campus, data-center, and cloud results in more flat and dynamic networks where the static approach is no longer sufficient nor applicable. Existing current static segmentation methods are no longer able to keep up with both the network growth and the network changes. An existing methodology attempts to solve this problem using proprietary hardware, 802.1x, and data tags based on hardware.

An entity or entities, as discussed herein, include devices (e.g., computer systems, for instance laptops, desktops, servers, mobile devices, IoT devices, OT devices, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users. Depending on the entity, an entity may have an IP address (e.g., a device) or may be without an IP address (e.g., a serverless service). Embodiments are able to dynamically (e.g., on the fly or responsive to changing conditions, for instance, an entity being communicatively coupled to a network or in response to determination of characteristics of an entity) control access of various entities or micro-segment various entities, as described herein.

The enforcement points may be one or more network devices (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the entity and one or more other entities communicatively coupled to a network. Access rules may control whether an entity can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any device that is capable of filtering, controlling, restricting, or the like communication or access on a network.

Segmentation tools may show IP addresses or groups of devices that are communicating with each other. For example, this may be shown as a matrix with a dot indicating communication between a pair of device groups. While useful, in order for an administrator to verify that the segmentation is proper for each pair of groups, the administrator needs to click the dot to view the communications between the groups and other details. From there the administrator can then analyze the data and drill down into the data to determine whether the device groups and which devices in the groups should be allowed to communicate. This can be a labor intensive process, as each pair of groups that are communicating are analyzed and multiple clicks are further involved in getting the segmentation of the groups configured (for instance, including for particular devices in each device group). This can be particularly time consuming if the network is large and there are lots of communications between different device groups. More specifically, if the dimensions of the traffic matrix are N×N, the user has to perform an order of $N^2$ operations to complete the analysis of the matrix which is not practical and not scalable as a network grows.

Further, the groups communicating matrix paradigm necessitates the administrator to search for anomalies among large numbers of groups that are communicating and review each one on a one by one basis. It may take a significant amount of time for an administrator to determine even a single anomaly. Alternatively, an administrator may just look at raw traffic logs which is even more tedious and time consuming.

Embodiments determine groups or clusters of entities based on network interactions or communications (e.g., communication patterns). This can be based on which entities talk amongst each other, what IP addresses entities communicate with externally (e.g., on the Internet), etc. Embodiments thus cluster entities that have similar network traffic communication or behavior. This can provide a higher level view of trends on a network while allowing focus to be drawn to anomalies. Embodiments may cluster entities based on additional factors or aspects including properties (e.g., vendor, DHCP properties, MAC address, function, etc.), other information used for classification, classification, security information, etc. Each entity may be shown as a dot with a color associated with the cluster.

Behavior as used herein and analyzed by embodiments can include network communications of entities (e.g., at various points in time and over various time periods), traffic flows, events, dynamic events, alerts, etc. A dynamic event can be an event that represent a change as compared to a previous event. This can include changes in properties associated with an entity (e.g., a change in a MAC address), security events (e.g., an indicator of compromise (IOC) or communication with a nefarious or blacklisted site), etc. In some embodiments, the security events be accessed from another system (e.g., system 150, an external system, or third party system).

In some embodiments, the network traffic is analyzed using machine learning (e.g., unsupervised learning) on traffic data (e.g., five tuples of source IP, destination IP, source port, destination port, and bytes, among others) to find entities that are communicating with other devices and to group them into clusters. The clustered entities (e.g., based on communications) can then be put into a segment or visualized for review, as described herein.

In some embodiments, a graph based clustering/community detection approach is taken to separate the network into segments of entities. A graph can be constructed from the flows of traffic associated with entities and graph based techniques used to determine one or more clusters of entities. For example, a weighted undirected graph is created based on network traffic where the nodes are the identifiers of the endpoints and the edges represent the communication between endpoints. The weights on the edges can be a function of five tuple information (e.g., source IP, destination IP, source port, destination port, and bytes, among others) and bytes transferred between the nodes. Once such a graph is formed, "communities" of endpoints (e.g., groups of nodes within which connections are dense, but between which connections are sparser) are identified. Such "communities" are highly likely to represent segments in real world environments. For instance, in a medical environment, a set of infusion pumps and the infusion pump server form a community of devices since they often communicate with each other, whereas an infusion pump and a smartphone will not belong to the same "community." Each of these entity communities can then be mapped to a physical network segment or visualized for review. Community based methods of clustering may further be used to determine clusters based on a higher degree of connectedness of entities within a community and lower connectedness between communities. Embodiments may support clustering of entities using a variety of algorithms or techniques.

The machine learning clustering, graph based clustering, and other clustering techniques may be used individually or in any combination and may be used in combination with properties associated with each entity (e.g., DHCP, protocol information, vendor, MAC address, etc.) to determine clusters of entities. In some embodiments, the use of properties associated with each entity may be based on the availability of the properties (e.g., active properties may not be available in certain environments).

Embodiments may further determine what constitutes a typical or normal behavior traffic pattern and what is an abnormal behavior traffic pattern. The grouping of different entities in association with behavior traffic patterns enables a user (e.g., administrator) to make more informed decisions. This analysis of traffic patterns or behavior may provide information that is different and able to augment properties and other aspects associated with entities. This thereby enables more sophisticated grouping of entities into clusters and analysis for one or more anomalies.

In some embodiments, the clustering may be based on security aspects including risk score or entropy (of the destination). Risk scores may be used to determine the clusters to show the riskiest entities within a network or possibly within each cluster. For example, the clusters determined may be a high risk cluster, a medium risk cluster, and a low risk cluster. As another example, the risk score may reflect the number of vulnerabilities an entity has and a high risk cluster based on risk scores may include entities that have the highest number of vulnerabilities. In some embodiments, entities may be clustered based on risk or risk in combination with other aspects (e.g., communication/behavior, properties, etc.). Communication of entities in the high risk cluster may be prevented or blocked from entities in the medium and low risk score clusters (e.g., based on user input or automatically, for instance without user input or involvement).

Embodiments may further support tuning, configuring, or customizing of clustering of entities by a user. For example, a user may select behavior based clustering to have clusters determined based on behavior and enable identification of anomalies based on behavior. A user may further select behavior and classification based clustering to get a more comprehensive view of clusters. In some embodiments, automated solutions, e.g., machine learning or community detection, may be used to determine the clusters. For example, machine learning based grouping can be based on a bunch of characteristics that each entity exhibits, network behavior of each entity, bytes sent to each entity, the entity type, vendor, VLAN, where the entity is located in the network, or other characteristics. The machine learning may be used to learn the characteristics of many entities and based on several of the entities exhibiting the similar behavior along many characteristics the entities may be clustered together or put into a group. In some embodiments, one or more techniques or algorithms for clustering may be selected by a user.

In some embodiments, a user may select a subset of entities, subset of a network, etc., to be clustered to enable focus on a particular problem. For example, if a switch vulnerability was released, a user may select switches to be clustered. Embodiments may then determine clusters of switches based on behavior, vulnerabilities, risk score, etc., thereby allowing a user to analyze each cluster instead of having to analyze the switches within data including the other entities of the network.

In some embodiments, a user (e.g., administrator) can be customize how the grouping or clustering is determined using a policy as an aspect. For example, a user may configure a rule based policy, to group entities with selected characteristics (e.g., port information, protocol information, traffic behavior, etc.) in a group and or portion of a group of the entities of the group may then be analyzed together. A cluster may thus include a group of entities based on a policy.

Embodiments may also determine clusters of entities from a group of entities determined based on a policy. As example policy may identify entities that have outbound data or sent data amounts greater than 10 Terabytes (TB) of data. Entities meeting the policy condition(s) may be put in their own cluster. Entities identified as meeting policy condition(s) can be flagged or indicated visually (e.g., with a different color or other visual marking) among entities in a cluster. For example, two laptops that transferred 10 TB of data can be marked as red dots in a cluster of laptops where the laptops not meeting the condition are colored blue.

In some embodiments, clustering may be based on one or more policies in combination with other aspects. For example, behavior analysis and clustering can further be applied to the entities identified by the policy. For example, an entity such as a server, for instance a web server, that typically transmits over 10 TB may not be flagged with a yellow color or regular color as compared to a laptop the transmitted over 10 TB which may be flagged with a red color.

In some embodiments, clustering may be based on entropy or entropy in combination with other aspects. Entropy is the degree of dispersal of concentration in a distribution. The entropy may be measured over ports, addresses, sources, destinations, etc. Entropy of destination is the degree of dispersal of destinations of communications. Entropy of destination may be defined by the equation:

$$\text{entropy} = \sum_{n_i=0}^{m} \frac{n_i}{s} \log \frac{n_1}{s}$$

where s is the total count of connections, m is the number of IP addresses, and $n_i$ is a number of connections to each IP address i.

The grouping or clustering of different entities together in a group or cluster further simplifies the analysis flow. This enables a higher level view including clusters of entities clustered together based on similar characteristics or aspects, which simplifies the number of things that a user has to analyze. For example, different kinds of IP cameras may have similar network behavior and may therefore be put in the same cluster. The communication of the IP cameras to a video storage server may be expected while communications of the IP cameras to other groups of entities (e.g., industrial OT devices) may not be expected and identified as an anomaly.

After clustering of entities, anomaly detection may be performed. The anomalies may reflect variances of an entities on several aspects from other entities in clusters or entities within a cluster. Anomalies detected can include detecting a spoofed MAC address, an entity behaving like another device (e.g., a smartphone going to printer update sites), or an entity receiving or sending an abnormal amount of data (e.g., a laptop transferring 10 TB of data). Embodiments support using different time windows for analyzing behavior to detect anomalies.

An anomaly may be identified based on how an entity of a cluster communicates over time being compared to communication varying from the previously observed communications. For example, an NTP server that has been observed over time communicating with only three outside or external IP addresses, then suddenly it is communicating with a new cloud service and 50 or 100 outside or external IP addresses. The sudden change in communications of the NTP server can be identified as an anomaly. This NTP server may be indicated as red dot in a cluster (e.g., FIG. 5) and the communication of a cluster, including the NTP server, may be marked as red in a matrix (e.g. FIG. 6). A user may click the red dot in either case to see more details and further investigate.

In some embodiments, an anomaly may be detected based on identifying specific entity that might be clustered with other entities of the same type but is behaving in one or more ways that are unlike the rest of the entities in the cluster. For example, a specific device might be grouped with printers but is behaving abnormally or differently than the other printers in some manner. As another example, a single smartphone may also be grouped with printers and embodiments enable a user to further investigate. This can save the user substantial time over going through each of the $N^2$ (where N is the number of groups) number of connections between groups to find the single smartphone. The clustering by embodiments can visualize or reveal where anomalies lie and where entities are behaving unexpectedly, or where unexpected communication is happening.

In some embodiment, a count of the entities within a cluster may be shown to allow the comparison with the actual count of entities in the network. For example, a cluster of printers may be shown with one less printer than the actual number of in the network. This can allow a user aware to become aware that a printer is missing from analysis of the network. In various embodiments, counts of entities in each clusters may be compared with an inventory system or other asset tracking system to identify variances.

Embodiments may provide different views for simplifying user analysis of anomalies (e.g., by collapsing or combining multiple rows of a matrix of communications). In one view, anomalies may be flagged or indicated by clustering based on traffic (e.g., FIGS. 4-5). In another view, anomalies may be shown in relation to a larger time window to allow detection and viewing of anomalies over a longer period of time (e.g., FIGS. 4-5 with a larger time window). Embodiments thus allow a user to explore data in different ways thereby allowing them to discover and act upon various security or other problems.

Embodiments can apply a second layer of logic on top of representations of communications between groups of entities to provide more useful information about entities and entity behavior. This thereby reduces the burden on the administrator and enables him or her to more quickly find and analyze anomalies. Embodiments may present a matrix or visualization depicting communication between clusters of entities that reduces or collapses the rows and columns into a smaller and more manageable matrix thereby making analysis simpler. For example, matrices of traffic between groups may typically be organized on a single dimension of device type, certain IP address ranges, MAC address range, vendor range, etc. Using analysis of network traffic (or behavior), embodiments can group entities on more than just on the same device type or device characteristics or properties. Embodiments can do this based on identifying entities based on how the entities are behaving or communicating on the network and the flows of communications or network traffic that the entities are generating.

Embodiments may thus simplify (e.g., collapse, shorten, etc.) an N×N matrix (where N is the number of groups) to and 2N×2N matrix because multiple entity types or multiple groups that were originally formed can be combined together into a single group or cluster due to being similar from a network traffic point of view (e.g., behavior point of view). This reduction in the matrix may be based on preconfigured clustering or customized clustering (e.g., by a user), as described herein. This reduction in the matrix thereby reduces the data or items for a user to review to identify issues or anomalies and take action. The clustering to reduce the matrix size may also reveal anomalous clusters which should not be present which will further refine the reduction of the matrix. This reduction in matrix size thus reduces on the burden on the user.

For example, with a network of printers, cameras, and computers, the raw or initial matrix may be 1,000×1,000 matrix. Each row or column of the matrix may represent an IP address and each intersection of row and column representing communication between the IP address associated with a row and the IP address associated with a column. After clustering, the majority of the cameras may be in a one cluster, printers in a printers cluster, and computers in a computer cluster, but one of the cameras in the printer cluster. The matrix may be reduced to 3×3 showing communications between the three clusters (e.g., with each row and each column associated with a cluster). Each region of the matrix that represents similar behavior can be represented as one point or intersection of row and on the matrix. In some embodiments, each intersection of the matrix may have a region showing details of the behaviors or communications between clusters (e.g., FIG. 6). In various embodiments, the volume or amount of traffic between two clusters may be represented based on the size of the dot, e.g., with more traffic in bytes being a larger dot (e.g., FIG. 6). The size of the dot may also be based on the number of entities communicating between the two groups. A red dot in the matrix may indicate that there is a possible anomaly in communications between the camera group and another group. The anomaly of the camera in the printer cluster can be flagged or visually indicated among the various clusters by embodiments which allow selection and investigation of the individual camera that is in the printer cluster (e.g., FIG. 5).

As another example, a matrix with rows and columns for each vendor may be a 30×30 matrix. Each row or column of the matrix may represent a group of entities associated with a vendor and each intersection of row and column representing communication between a group of entities associated with a vendor associated with a row and a group of entities associated with a vendor associated with a column. Embodiments may simplify or collapse the matrix based on entities of multiple vendors having similar communications or behavior, e.g., communicating with the same DNS server, NTP server, websites, or creating a particular amount of traffic multiple times, etc. The result of the simplification may be a 4×4 matrix based on 4 clusters being determined (e.g., each cluster having one or more entities associated with different vendors).

After an anomaly has been identified, a variety of actions may be performed, as described herein. For example, communications between two clusters could be blocked or segmentation applied to two clusters. Embodiments may automatically translate a cluster of entities into IP addresses, determine segmentation rules, and apply the segmentation rules to each entity of the cluster. Embodiments may support applying segmentation across a network, applying micro segmentation (e.g., segmentation at the edge of a network to filter traffic, for instance, via one or more ACLs), or some combination thereof. The micro-segmentation may be applied at the port level where an entity is communicatively coupled to a network.

In some embodiments, network traffic is analyzed to determine segments or proposed segments for a network based on actual communications. By using the network traffic to determine proposed network segments and visually depicting this, focus and prioritization can be applied to each entity that has one or more associated anomalies (e.g., communicating with other device types that are not standard or common for communications, for instance, a manufacturing OT device and a financial system device, or a device configured in a wrong segment).

Embodiments may further support running a simulation using live traffic to determine if there will be issues caused by blocking communications between two clusters. For example, a list of communications that will be blocked by segmenting the clusters from each other may be determined and displayed. A visualization of the cluster and entities of the clusters that will have communications blocked may be display as part of the simulation. The simulation may include a button to initiate application of the rules, segmentation policy, etc., that is being simulated.

In some embodiments, the clustering and anomaly functionality may be available via modules available through a cloud resource (e.g., a cloud based security product, cloud based network monitor entity, etc.). This can enable updated clustering functionality to be deployed to a network monitor entity (e.g., a network monitor devices 102 and 280) via the cloud. In various embodiments, a user will be able to select one or more clustering modules available via the cloud.

Embodiments advantageously enable benefits including determining clusters of entities that are communicating based on traffic analysis and visualizing this information to provide visualizations of clusters of entities that are communicating, visually highlighting entities in clusters that are dissimilar to other entities of the cluster, and a matrix (e.g., a high level matrix) showing the communications between clusters (e.g., including the volume of data or indicators of communications between the clusters). Embodiments thus allow visualizing anomalies of devices that are communicating in multiple ways thereby reducing significantly the amount of user effort and time needed to find and investigate anomalies. This can reduce the time necessary to come to a security decision thereby accelerating the response time. This can be very important during a rapid response situations where critical entities are under attack or compromise.

Advantageously, embodiments are configured to detect one or more anomalies, via clustering, to enable rapid analysis of the anomalies and enable prompt response. Users are thus able to focus in on unusual behavior or other aspects combined with behavior instead of having to sift through large numbers of communications occurring on a network. This allows rapid detection and analysis of anomalies thereby improving security. Embodiments can be used be in a variety of environments including, but not limited to, campus, data center, cloud, and operational technology or industrial environments.

Accordingly, described herein in various implementations are systems, methods, techniques, and related technologies, which may perform clustering and anomaly detection. As described herein, various techniques can be used to cluster entities based on various aspects (e.g., behavior, properties, security characteristics, network portion, etc.) and detect anomalies based on selected aspects.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

An access, segmentation, or micro-segmentation policy, in accordance with embodiments, can include a variety of rules for a variety of entities (e.g., users, devices, locations, compliance, risk, etc.). The rules can be applied or configured on one or more enforcement points (e.g., a switch, for instance an access switch, a core switch, an aggregation switch or combination thereof, firewall, router, wireless controller, VPN gateway, virtual network infrastructure, cloud infrastructure, etc.). In some embodiments, ACLs are used to provide granular access control or micro-segmentation on a per port or per entity basis (e.g., ACLs customized specifically for each entity). For example, a printer may be restricted from communicating with other printers based on ACLs on a switch instead of the being in a printer segment where each printer can communicate with each other, for instance on a printer VLAN segment.

FIG. 1 depicts an illustrative communication network 100, in accordance with one implementation of the present disclosure. The communication network 100 includes a network monitor device 102, a network device 104, an aggregation device 106, a system 150, devices 120 and 130, and network coupled devices 122a-b. The devices 120 and 130 and network coupled devices 122a-b may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor device 102, devices 120 and 130, and network coupled devices 122a-b. Network device 104 may be one or more network switches, access points, routers, firewalls, hubs, etc.

Network monitor device 102 may be operable for a variety of tasks including determining behavior, one or more properties, classification, security aspects, clusters, and anomalies, and data structures of communications (e.g., a communication matrix), as described herein. Network monitor device 102 can perform the clustering, anomaly detections, and associated functions locally, in combination with a cloud resource (e.g., cloud based product, cloud based network monitor entity), or upload information to a cloud resource to have the cloud resource perform the clustering, anomaly detection, and associated functions described herein.

Network monitor device 102 may further determine and optionally implement access policies, segmentation policies, or other polices, as described herein (e.g., with user interaction or automatically, for instance without user interaction). Network monitor device 102 can determine one or more enforcement points where the entity is communicatively coupled to the network and thereby determine the one or more enforcement points closest to the entity. For example, network monitor device 102 may access information on a switch (e.g., a switch cache) to determine a port (e.g., physical port, wireless port, or virtual port) where an entity with a particular IP address or MAC address or other identifier is communicatively coupled. Network monitor device 102 may also access information from a wireless access point where the entity is communicatively coupled. In some embodiments, network monitor device 102 may poll information from a cloud service to determine where an entity is communicatively coupled or connected to a network. In various embodiments, network monitor device 102 access syslog or SNMP information from an entity itself to determine where an entity is communicatively coupled or connected to a network (e.g., without accessing information from a network entity or enforcement point). Network monitor device 102 supports applying access policies in situations where an entity is communicatively coupled to a network with more than one connection (e.g., a wired connection and a wireless connection).

Based on the enforcement point, network monitor device 102 determines the one or more access rules to be assigned to the one or more enforcement points based on the access policy. In some embodiments, based on information about the one or more enforcement points closest to the entity, network monitor device 102 translates the access policy into one or more commands that will be used to configure the access rules on the one or more enforcement points. The closest enforcement point to an entity can be enforcement point where the entity is communicatively coupled. The enforcement point may be network device or network infrastructure device closest in proximity (e.g., physical proximity) to the entity. The enforcement point comprises the port where the entity is communitive coupled to the network, and communication to and from the entity is sent first through that port. In some embodiments, the port of the enforcement point is the last point of communication within network infrastructure before communication is sent to the entity. In various embodiments, the closest enforcement point is where communication from the entity is initially sent when communications are sent from the entity (e.g., prior to communications with the network backbone or Internet backbone). For example, the closest enforcement to an entity connected to a switch is the switch. As another example, the closest enforcement point to an entity wirelessly communicatively coupled to a wireless access point is wireless access point. In various embodiments, network monitor device 102 may access the current configuration of the one or more enforcement points to determine the access rules (e.g., ACLs) that are to be applied to the one or more enforcement points, as described herein. In some embodiments, an entity is communicatively coupled to a wireless controller via a wireless access point and the wireless controller or a switch is the closest enforcement point (e.g., based on the wireless controller or the switch being able to apply access rules, for instance ACLs, to communications of the entity, for instance, in the case where the wireless access point is not able to or does not have the functionality to apply access rules). In various embodiments, an entity is communicatively coupled to a layer 3 switch via a layer 2 switch and the layer 3 switch is the closest enforcement point (e.g., based on the layer 3 switch being able to apply access rules, for instance ACLs, to communications of the entity, for instance, in the case where the layer 2 switch is not able to or does not have the functionality to apply access rules).

Network monitor device 102 may then apply or assign the access rules to the one or more enforcement points closest to the entity. Network monitor device 102 may communicate the access rules via application programming interfaces (APIs), command line interface (CLI) commands, Web interface, simple network management protocol (SNMP) interface, etc. In some embodiments, network monitor device 102 may verify that the one or more enforcement points have been properly or correctly configured based on the access rules.

Network monitor device 102 may provide an interface (e.g., a graphical user interface (GUI)) for viewing, monitoring, and modifying clusters and anomalies, as described herein. In some embodiments, network monitor device 102 is operable to perform visualization (e.g., including tables or matrixes) of communications between clusters (e.g., FIG. 6). Network monitor device 102 may further monitor network traffic over a period of time (e.g., user configurable) to determine the ongoing behaviors of entities of a network, as described herein.

Network monitor device 102 may further perform a variety of operations including identification, classification, and taking one or more remediation actions (e.g., changing network access of an entity, changing the virtual local area network (VLAN), sending an email, sending a short message service (SMS) message, etc.).

An enforcement point may be a router, firewall, switch, hypervisor, software-defined networking (SDN) controller, virtual firewall, or other network device or infrastructure that may have an ACL like or rule like policy or functionality to apply based on the port where an entity is communicatively coupled thereto. Enforcements points may also be a next generation firewall (NGFW) and cloud infrastructure. A NGFW can be updated with an ACL like policy regarding an entity accessing the Internet. Cloud infrastructure (e.g., amazon web services (AWS) security groups) can be updated to drop packets from the IP of the entity that have a destination outside the cloud. Embodiments are operable to configure enforcement points at the edge of a network where an entity is communicatively coupled thereto thereby controlling access of the entity on a customized basis (e.g., customized or tailored for the entity).

In some embodiments, if the categorization or characteristics functionality is being updated (e.g., which could result in a change in one or more access rules that are assigned to an enforcement point closest an entity and thus impact the enforcement of an access policy by the enforcement points), notifications may be sent (e.g., via email or other methods as described herein) or presented to a user (e.g., via a graphical user interface (GUI)) to indicate that the categorization or characteristics of one or more entities is changing and should be confirmed before one or more enforcement points are updated based on the changed categorization or characteristics. After conformation, the access rules may be changed.

Network monitor device 102 may be a computing system, network device (e.g., router, firewall, an access point), network access control (NAC) device, intrusion prevention system (IPS), intrusion detection system (IDS), deception device, cloud-based device, virtual machine based system, etc. Network monitor device 102 may be communicatively coupled to the network device 104 in such a way as to receive network traffic flowing through the network device 104 (e.g., port mirroring, sniffing, acting as a proxy, passive monitoring, etc.). In some embodiments, network monitor device 102 may include one or more of the aforementioned devices. In various embodiments, network monitor device 102 may further support high availability and disaster recovery (e.g., via one or more redundant devices).

In some embodiments, network monitor device 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor device 102 may be based on a combination of one or more pieces of information including traffic analysis, information from external or remote systems (e.g., system 150), communication (e.g., querying) with an aggregation device (e.g., aggregation device 106), and querying the entity itself (e.g., via an API, CLI, web interface, SNMP, etc.), which are described further herein. Network monitor device 102 may be operable to use one or more APIs to communicate with aggregation device 106, device 120, device 130, or system 150. Network monitor device 102 may monitor for or scan for entities that are communicatively coupled to a network via a NAT device (e.g., firewall, router, etc.) dynamically, periodically, or a combination thereof.

Information from one or more external or $3^{rd}$ party systems (e.g., system 150) may further be used for determining one or more tags or characteristics for an entity. For example, a vulnerability assessment (VA) system may be queried to verify or check if an entity is in compliance and provide that information to network monitor device 102. External or $3^{rd}$ party systems may also be used to perform a scan or a check on an entity to determine a software version.

Device 130 can include agent 140. The agent 140 may be a hardware component, software component, or some combination thereof configured to gather information associated with device 130 and send that information to network monitor device 102. The information can include the operating system, version, patch level, firmware version, serial number, vendor (e.g., manufacturer), model, asset tag, software executing on an entity (e.g., anti-virus software, malware detection software, office applications, web browser(s), communication applications, etc.), services that are active or configured on the entity, ports that are open or that the entity is configured to communicate with (e.g., associated with services running on the entity), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140. While network monitor device 102 may be able to receive information from agent 140, installation or execution of agent 140 on many entities may not be possible, e.g., IoT or smart devices.

System 150 may be one or more external, remote, or third party systems (e.g., separate) from network monitor device 102 and may have information about devices 120 and 130 and network coupled devices 122*a-b*. System 150 may include a vulnerability assessment (VA) system, a threat detection (TD) system, endpoint management system, a mobile device management (MDM) system, a firewall (FW) system, a switch system, an access point system, etc. Network monitor device 102 may be configured to communicate with system 150 to obtain information about devices 120 and 130 and network coupled devices 122*a-b* on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of an entity. The VA system may be able to catalog assets and capabilities or resources of an entity, assign a quantifiable value (or at least rank order) and importance to the resources, and identify the vulnerabilities or potential threats of each resource. The VA system may provide the aforementioned information for use by network monitor device 102.

The advanced threat detection (ATD) or threat detection (TD) system may be configured to examine communications that other security controls have allowed to pass. The ATD system may provide information about an entity including, but not limited to, source reputation, executable analysis, and threat-level protocols analysis. The ATD system may thus report if a suspicious file has been downloaded to a device being monitored by network monitor device 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor device 102.

The firewall (FW) system may be configured to monitor and control incoming and outgoing network traffic (e.g., based on security rules). The FW system may provide information about an entity being monitored including attempts to violate security rules (e.g., unpermitted account access across segments) and network traffic of the entity being monitored.

The switch or access point (AP) system may be any of a variety of network devices (e.g., network device 104 or aggregation device 106) including a network switch or an access point, e.g., a wireless access point, or combination thereof that is configured to provide an entity access to a network. For example, the switch or AP system may provide MAC address information, address resolution protocol (ARP) table information, device naming information, traffic data, etc., to network monitor device 102 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of an entity being monitored in real-time which can then be used to determine a risk level of the entity.

Aggregation device 106 may be configured to communicate with network coupled devices 122*a-b* and provide network access to network coupled devices 122*a-b*. Aggregation device 106 may further be configured to provide information (e.g., operating system, entity software information, entity software versions, entity names, application present, running, or both, vulnerabilities, patch level, etc.) to network monitor device 102 about the network coupled devices 122*a-b*. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), WiFi™ HaLow, HomePlug, Multimedia over Coax Alliance (MoCA), and Ethernet. For example, aggregation device 106 may be coupled to the network device 104 via an Ethernet connection and coupled to network coupled devices 122*a-b* via a wireless connection. Aggregation device 106 may be configured to communicate with network coupled devices 122*a-b* using a standard protocol with proprietary extensions or modifications.

Aggregation device 106 may further provide log information of activity and properties of network coupled devices 122*a-b* to network monitor device 102. It is appreciated that log information may be particularly reliable for stable network environments (e.g., where the types of devices on the network do not change often). The log information may include information of updates of software of network coupled devices 122*a-b*.

Figure 2:
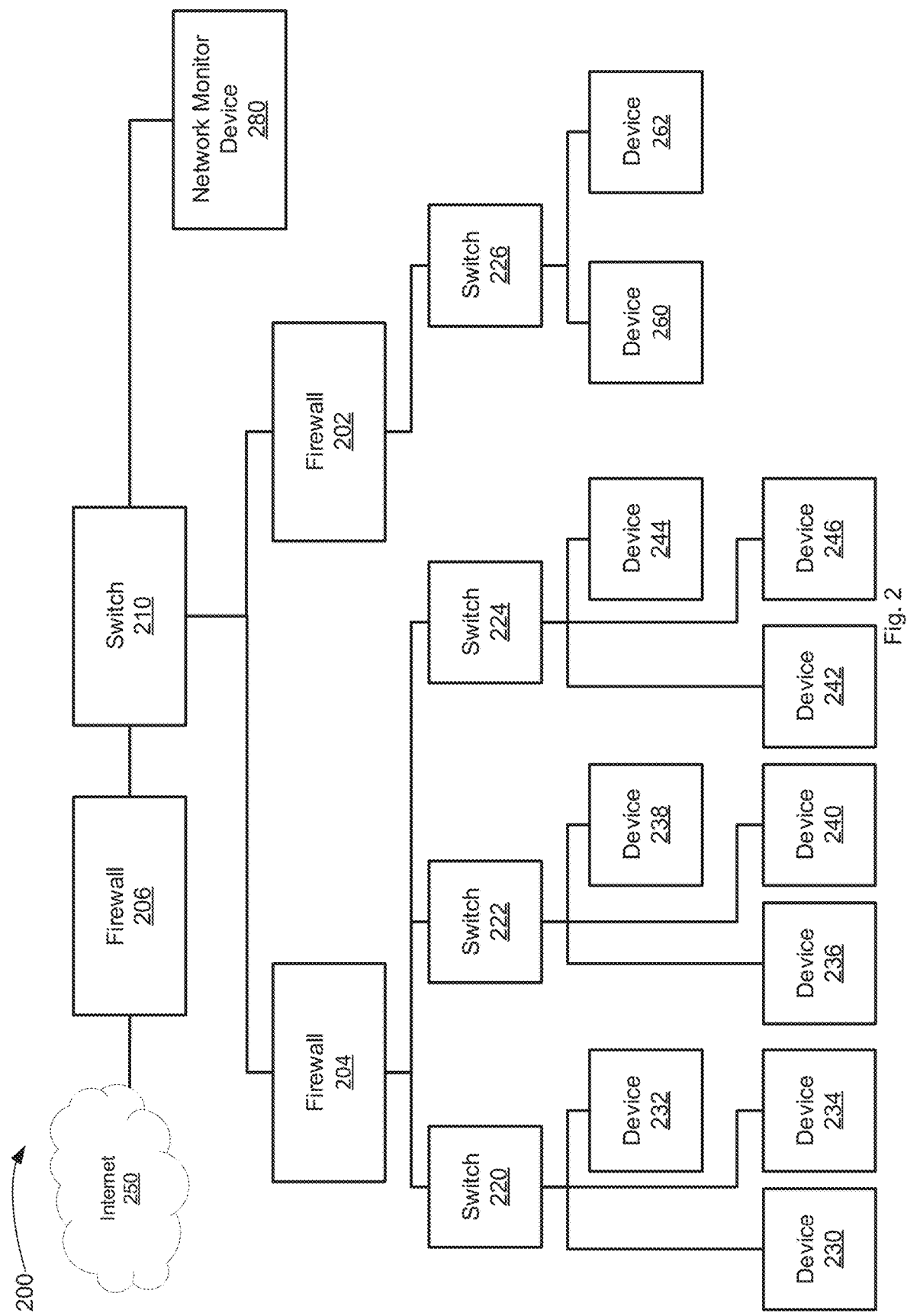
FIG. 2 depicts an illustrative network topology in accordance with one implementation of the present disclosure.

FIG. 2 depicts an illustrative network topology in accordance with one implementation of the present disclosure. FIG. 2 depicts an example network 200 with multiple enforcement points (e.g., firewalls 202-206 and switches 210 and 220-226) and a network monitor device 280 (e.g., network monitor device 102) which may determine clusters, determine anomalies, and perform one or more actions based on the clusters and anomalies determined, as described herein.

FIG. 2 shows example devices 230-262 (e.g., devices 106, 122a-b, 120, and 130, other physical or virtual devices, users, etc.) and it is appreciated that more or fewer network devices or other entities may be used in place of the devices of FIG. 2. Example devices 230-262 may be any of a variety of computing devices, as described herein. For example, the enforcement points including firewalls 202-206 and switches 210 and 220-226 may be any entity (e.g., network device 104, cloud infrastructure, etc.) that is operable to allow traffic to pass, drop packets, restrict traffic, etc. Network monitor device 280 may be any of a variety of network devices, e.g., router, firewall, an access point, network access control (NAC) device, intrusion prevention system (IPS), intrusion detection system (IDS), deception device, cloud-based device, virtual machine based system, etc. Network monitor device 280 may be substantially similar network monitor device 102. Embodiments support IPv4, IPv6, and other addressing schemes. In some embodiments, network monitor device 280 may be communicatively coupled with firewalls 202-206 and switches 210 and 220-226 through additional individual connections (not shown) (e.g., to receive or monitor network traffic through firewalls 202-206 and switches 210 and 220-226).

Switches 210 and 220-226 communicatively couple the various devices of network 200 including firewalls 202-206, network monitor device 280, and devices 230-262. Firewalls 202-206 may perform network address translation (NAT) and firewalls 202-204 may communicatively couple the devices 230-262, which are behind the firewalls, with network monitor device 280, switch 210, and firewall 206. Firewall 206 communicatively couples network 200 to Internet 250 and firewall 206 may restrict or allow access to Internet 250 based on particular rules or ACLs configured on firewall 206. Firewalls 202-206 and switches 210 and 220-226 are enforcement points, as described herein.

Network monitor device 280 is configured to determine on or more clusters of entities (e.g., devices 230-262) and anomalies associated therewith based on various aspects (e.g., behavior, properties, security characteristics, network portion, etc.), or a combination thereof on network 200, as described herein. Network monitor device 280 is configured to determine one or more access rules based the clustered and anomalies determined in association with devices 230-262, as described herein. The access rules can include ACLs customized or tailored to an entity based on the characteristics of the entity (e.g., a user logged into an entity, rules to allow printing at a printer but not allow the printer to communicate on particular ports or with other entities), as described herein.

Network monitor device 280 is operable to determine one or more enforcement points closest to an entity (e.g., a network device or enforcement point where a device is communicatively coupled), as described herein. For example, the enforcement point closest to the devices 230-234 is switch 220 and the enforcement point closed to devices 260-262 is switch 226.

Network monitor device 280 may further configure enforcement actions or assign access rules (e.g., ACLs) on switches 220-226 based on the characteristics of the entities (e.g., devices 230-262) coupled thereto, as described herein. For example, network monitor device 280, can assign access control rules to switch 220 to control or limit communications of device 230 based on being a printer and restrict device 230 from communicating with other printers. This would prevent a compromise or attack from spreading between multiple printers. The access control rules may be implemented by configuring one or more ACLs on switch 220. Network monitor device 280 thus can assign entity specific or customized access control rules at the edge of network 200.

Network monitor device 280 can access network traffic from network 200 (e.g., via firewalls 202-206) and may determine additional enforcement points of network 200 (e.g., switches 210 and 220-226). Network monitor device 280 may then query each of the enforcement points for the configuration information including access rules or policies or segmentation rules or policies. Network monitor device 280 may then translate that the configuration information into one or more portions (e.g., one or more access control rules, for instance, ACLs) of an access policy which may then be added to an existing access policy. Network monitor device 280 further can determine access control rules based on analysis of network traffic (e.g., based on a source and destination connections mapping), as described herein. The access policy based on the network traffic can then be combined with one or more access policy portions based on configuration information from the enforcement points. The access policy may further be based on a template or other resources.

Figure 4:
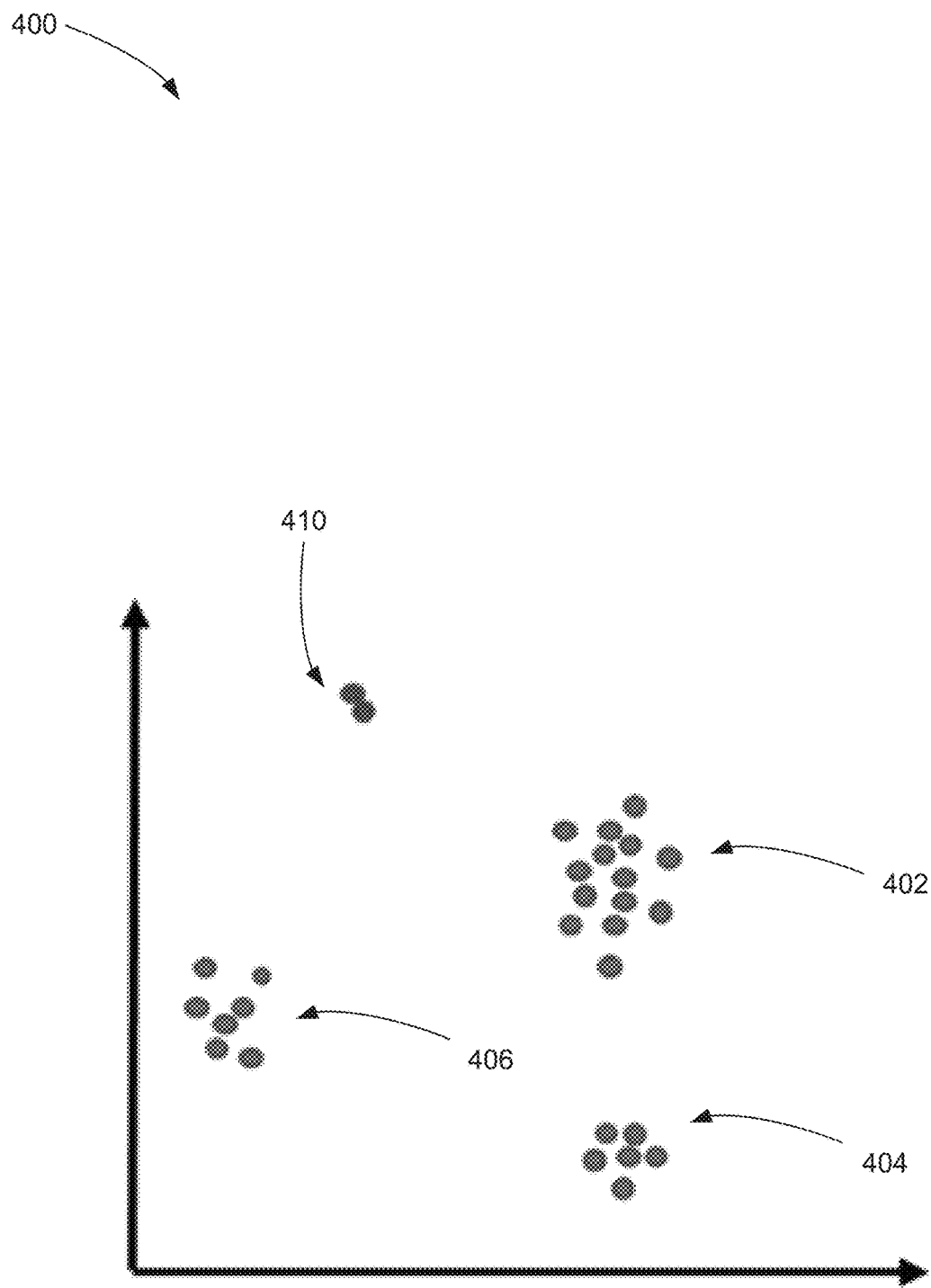
FIG. 4 depicts a diagram of aspects of an example graphical user interface for viewing clusters of entities including a potentially anomalous cluster in accordance with one implementation of the present disclosure.
Figure 5:
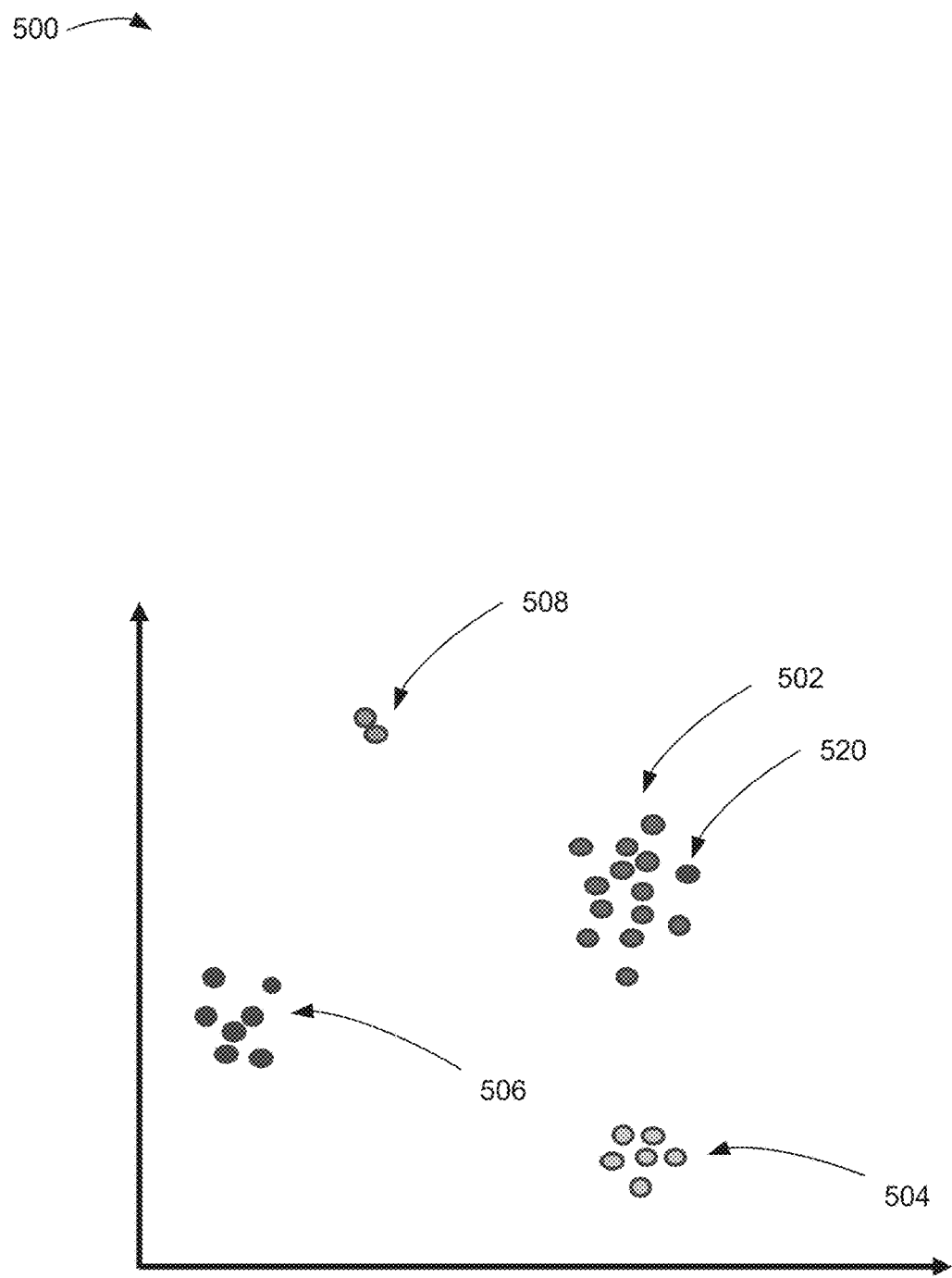
FIG. 5 depicts a diagram of aspects of an example graphical user interface for viewing clusters of entities including an anomalous entity in accordance with one implementation of the present disclosure.
Figure 6:
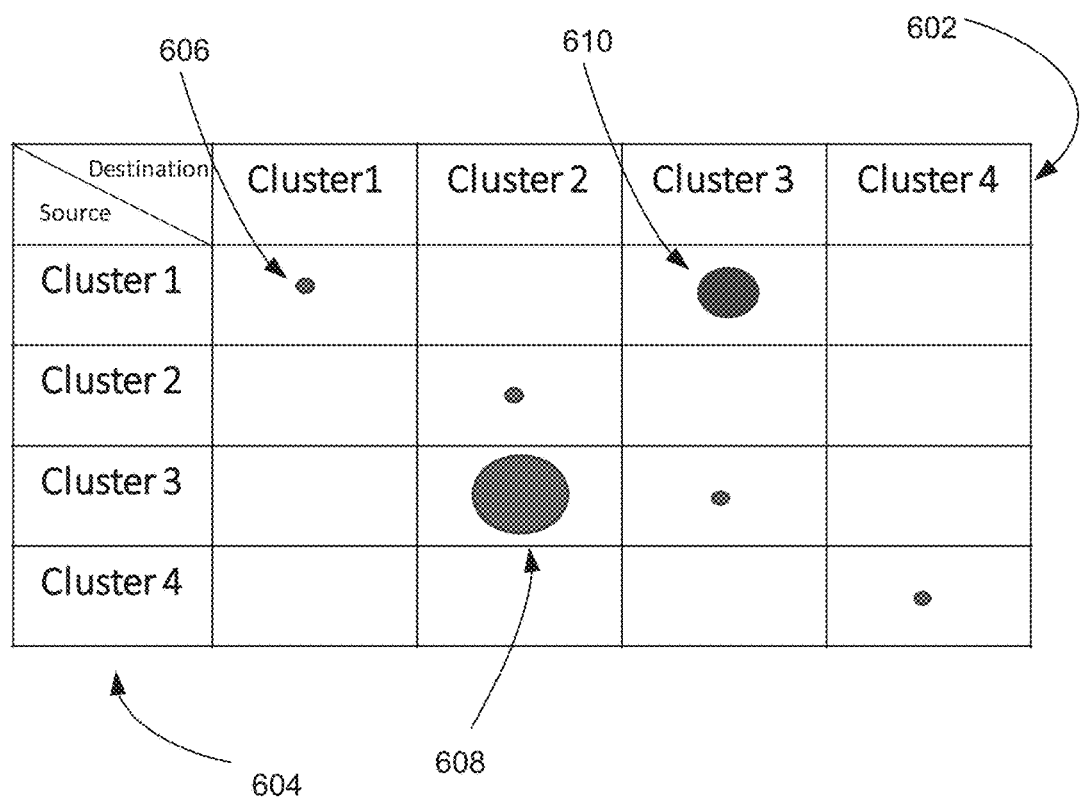
FIG. 6 depicts a diagram of aspects of an example graphical user interface including a matrix of communications between clusters of entities in accordance with one implementation of the present disclosure.

Network monitor device 280 may visually render, display, or present the clusters and anomalies, and communications in multiple views (e.g., FIGS. 4-6). In some embodiments, network monitor device 280 is configured to automatically implement the segmentation policy or a portion thereof across multiple enforcement points in response to an implementation command or automatically (e.g., without user interaction) in response to an anomaly. As part of the implementation, network monitor device 280 is configured to translate the access policy into specific configuration information (e.g., specific ACL commands) for switches 210 and 220-226 and firewalls 202-206 and communicate the specific configuration information for switches 210 and 220-226 and firewalls 202-206, as described herein.

For example, if devices 234 and 236 are IoT devices and device 230 is an accounting file server, network monitor device 280 may determine characteristics, properties, and clusters of devices 230, 234 and 236 and classify devices 230, 234 accordingly. Under traditional segmentation methodologies, if devices 230-246 are on a single segment, for example, a department segment, devices 230-246 may each communicate with each other. Similarly, devices 260 and 262 may communicate with each other (e.g., based on being on in a single segment). This ability to communicate between devices may mean that a compromise or attack could spread (e.g., laterally) between any of devices 230-246 or devices 260-262. Similarly, if devices 232, 238, and 244 are IP cameras in an IP camera segment which allows devices in the IP camera segment to communicate with one another then a compromise or attack could spread (e.g., laterally) between any of devices 232, 238, and 244. Embodiments are configured to determine (e.g., based on behavior analysis described herein and the like) to detect anomalies in behavior and optionally access rules to be assigned to enforcement points (e.g., switches 220-226) to control communications of devices 230-262 thereby preventing lateral movement of an attack or comprise, as described herein. For example, an access policy may specify that a cluster IP cameras and camera servers are not allowed to communicate with a printers cluster or an accounting systems cluster. Network monitor device 280 may determine access rules (e.g., ACLs) based on that access policy so that switch 220 block packets with a source IP associated with device 232 and a destination of the IP address associated with device 238.

Figure 3:
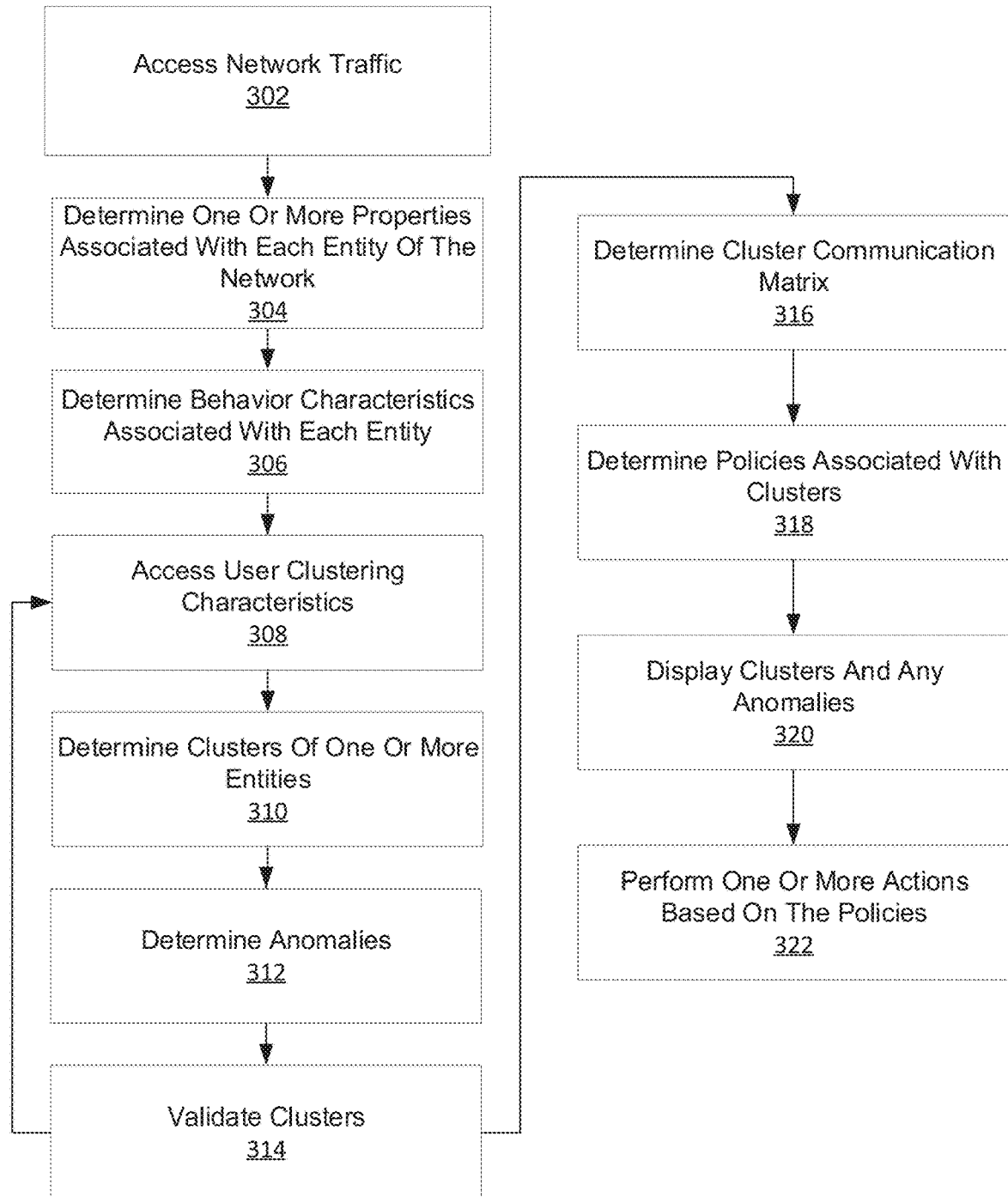
FIG. 3 depicts a flow diagram of aspects of a method for determining one or more clusters of entities in accordance with one implementation of the present disclosure.

With reference to FIG. 3, flowchart 300 illustrates example operations used by various embodiments. Although specific operation blocks ("blocks") are disclosed in flowchart 300, such blocks are examples. That is, embodiments are well suited to performing various other blocks or variations of the blocks recited in flowchart 300. It is appreciated that the blocks in flowchart 300 may be performed in an order different than presented, and that not all of the blocks in flowchart 300 may be performed.

FIG. 3 depicts a flow diagram of aspects of a method for determining one or more clusters of entities in accordance with one implementation of the present disclosure. Various portions of flowchart 300 may be performed by different components (e.g., components of system 700) of an entity (e.g., network monitor device 102 or network monitor device 280). Flowchart 300 depicts a process for determining one of more clusters of entities, detecting one or more anomalies, and visualizing data associated with the clusters and anomalies.

At block 302, network traffic is accessed. The traffic may be accessed by a network monitoring entity (e.g., network monitoring devices 102 or 280) via a port mirroring or SPAN port or via another method, as described herein. The traffic data may include one or more properties for each entity communicatively coupled to one or more networks and the one or more properties may be extracted from the traffic data. The traffic may include active scanning properties (e.g., if active scanning is enabled).

In some embodiments, data is further accessed from third party systems (e.g., system 150, an external system, etc.) and used along with traffic data. The data from third party systems may be accessed from the third party systems via a plugin or module of the network monitoring entity. For example, this data could be accessed from a variety of systems including, but not limited to, a vulnerability assessment (VA) system, a threat detection (TD) system, endpoint management system, a mobile device management (MDM) system, a firewall (FW) system, a switch system, an access point system, a WMI script, network infrastructure, an entity itself, etc.

In some embodiments, the network traffic is accessed based on an entity being selected or being communicatively coupled to a network. The entity may be selected as part of a periodic scan of the network (e.g., a scan of network 100 by network monitoring device 102). The entity may further be selected as part of a continuous, real-time, or combination thereof scan of the network. The entity may be an endpoint, a user, etc., as described herein. An entity being communicatively coupled to the network may be detected (e.g., being communicatively coupled to network device 104 or other enforcement point). The detecting of the entity coupled to the network may include detecting the entity in response to the entity being recoupled or readmitted to the network. This may further include detecting that a user has logged into a machine or the active user account on a device has changed.

At block 304, one or more properties associated with each entity of the network are determined. The properties can include data or values extracted from network traffic associated with each entity. This may include NIC vendor (e.g., portion of a MAC address), dynamic host control protocol (DHCP) vendor class, HTTP user agent string, operating system (OS) data, network function, transmission control protocol/internet protocol (TCP/IP) Syn Ack fingerprint, virtual machine guest OS, Nmap-Banner, Windows™ version, DHCP hostname, Macintosh Manageable, DHCP device class, Linux Manageable, open ports, DHCP options list, DHCP request list, DHCP device OS, MAC Address, Macintosh OS Version, DNS Name, Linux OS version, Switch Port power over Ethernet (PoE) connected device, system description, Classified by Action or operator classified, device is a NAT device, Windows Services Installed, and Switch Port Name.

Properties may be collected or accessed from various of sources including, from the entity, from the network environment, network devices or enforcement points (e.g., one or more switches, routers, firewalls, etc.) and any other entity or resource communicatively coupled to the network (e.g., network 100) including other systems (e.g., system 150). The properties may be determined by an entity (e.g., network monitor device 102 or network monitor device 280) that is configured to perform one or more blocks of flowchart 300.

The properties may further include classification, identification, device categorization, user categorization, location, compliance, risk, or a combination thereof which may be based on fingerprints, signatures, entity behavior, etc., as described herein. Embodiments are able to determine the one or more behavior, properties, or other aspects of an entity agentlessly (e.g., based on observing network traffic) thereby allowing behavior, properties, or other aspects of an entity to be quickly determined for entities that do not have or support an agent as well as without needing an agent to be installed for entities that do support an agent. In some embodiments, the one or more behaviors, properties, or other aspects are determined in real-time. For example, a compliance characteristic may be determined based on an antivirus scan that is specified in a network access policy.

At block 306, behavior associated with each entity of the network is determined. The behavior can be determined based on entities an entity communicates with, network traffic patterns, e.g., communicating with the same server, an NTP server, or website, creating a particular amount of traffic multiple times, bytes sent by and received by the entity over time, entity type, where in the network the entity is located, etc., as described herein. In some embodiments, the behavior determination may include accessing security relevant behavior including communications with a blacklisted host or device, vulnerability, IOC, security alert, as described herein.

At block 308, user clustering aspects or characteristics are accessed. The user clustering characteristics may be customizations or user selections of how clustering is to be performed, as described herein. The customizations may be used to customize clustering based on one or more of behavior, properties, selected entities, entities determined based on a policy, security aspects (e.g., security risk), etc., as described herein. The user clustering characteristics may be configured based on a user's goals or objectives (e.g., detecting security issues, finding anomalous behavior, detecting poorly segmented groups, managing devices with similar functionalities, locations, logical groups, etc.).

At block 310, one or more clusters of entities are determined, as described herein. The clusters may be based on having similar behavior (e.g., network traffic patterns, for instance, source IP, destination IP, source port, destination port, bytes, etc.), properties, security aspects (e.g., risk scores), etc., as described herein. In some embodiments, the clusters may be determined using machine learning based on behavior (e.g., network traffic patterns), properties, security aspects (e.g., risk scores), etc., or a combination thereof.

At block 312, one or more anomalies are determined. The anomalies may be determined based on a distance from a cluster, unusual communications (e.g., as compared to similar or associated entities, for instance clients and servers in a cluster), policies, etc. In some embodiments, the anomalies are defined based on a policy with one or more conditions that when met or satisfied will qualify as an anomaly, as described herein. In various embodiments, the polices may be generated by machine learning. For example, the policy generated by machine learning may have a condition that an entity that is high risk that communicates with an entity that is low risk should be flagged as an anomaly. As another example, a policy can be generated which captures the situation where a majority of devices or endpoints in a group exhibit similar network behavior and a few endpoints deviate from that normal behavior and flags such endpoints with anomalous behavior. As another example, a policy generated by machine learning may have a condition that if an entity that usually communicates internally starts to communicate with an outside malicious site frequently, that entity should be flagged as an anomaly.

At block 314, one or more clusters are validated. The clusters may be validated by displaying the clusters and allowing a user to hover over, select clusters, select one or more entities of clusters to display various information about the entities and the clusters. The clusters may be displayed in a manner similar to FIG. 5. Upon a cursor hovering over an entity of a cluster, various details associated with the entity may be shown including the types of devices, the entity types in the clusters (e.g., 50 printers and one camera), purity score, risk of clusters or one or more entities, the amount of traffic, whether a cluster is high or low traffic, distance score associated with an entity, etc., as described herein. In some embodiments, the clusters may be identified with an entity type (e.g., printer or smartphone) or behavior based types (e.g., printer). In various embodiments, a score (e.g., a purity score) can be shown with each cluster or entity of a cluster (e.g., a distance measurement). The validation may allow the user to confirm that the determined clusters can be used for a matrix or a simplified matrix (e.g., as shown in FIG. 6).

The validation (phase) may allow a user to determine how entities should be clustered. For example, laptops and desktop computers may be clustered together based on similar behavior but a user may want laptops clustered separately to allow focus on multiple entities and can select an select to have the laptops clustered in a separate cluster from the desktop computers. This validation can thus allow visualization of anomalies according to clusters defined based on one or more selections by a user. A user may then adjust the clustering characteristics and block 308 performed so that the clusters (and anomalies) can be redetermined. If user validates the clusters, block 316 may be performed.

At block 316, a cluster communication matrix is determined. The cluster communication matrix may be determined based on determining a plurality of clusters based on one or more aspects (e.g., behavior, properties, security, etc.) of a plurality of entities, determining whether there is communication between each pair of clusters of the plurality of clusters, determining any anomalies in the communications of the entities, and determining which communications between pairs of clusters are associated with anomalies, or any combination thereof, as described herein. The matrix may include rows and columns representing each of the clusters and each cell at the intersection of each row and column may include a visual indicator (e.g., a circle or a dot) representing communication between the cluster associated with a row and the cluster associated with a column, as described herein. The visual indicator may be colored to represent whether there are one or more anomalies detected in communications between a pair of clusters (e.g. red) or whether there are no anomalies detection in communications between a pair of clusters (e.g., blue). The cluster communication matrix may show an indicator of communications between each pair of clusters, the volume of communication between each pair of clusters, and whether there are anomalies associated with each pair of clusters, as described herein. An example matrix is shown in FIG. 6.

At block 318, policies associated with clusters are (optionally) determined. The policies determined may be policies (e.g., segmentation policies) to limit communications between clusters, policies to restrict communications of entities associated with one or more anomalies, policies restricting communications of clusters or one or more entities based on security risk, policies which flag badly formed groups of entities with a high diversity of entity types and network behavior, policies to quarantine one or more entities to an isolated network, policies to turn off (e.g., power down or disable power to) one or more entities to avoid further damage to the one or more entities or other entities, policies to apply security patches to vulnerable entities, etc.

In some embodiments, one or more enforcement actions or access rules associated with the entity are determined. The access rules may be based on the access policy and the one or more characteristics of the entity. For example, where the entity is a printer, one or more access rules (e.g., ACLs) may be determined that limits access of the printer to communicate with smartphones, desktops, and laptop (e.g., based on VLANs associated with those devices) and prevents the printer from communicating with IP cameras, VOIP devices, and other clusters. In some embodiments, the access policy may be used to determine one or more access rules for an entity continuously and in real time.

For example, an accounting server may be determined to be subject to a non-Internet access policy meaning that it cannot access the Internet because of the sensitive data stored on the accounting server. The access rules for this may include blocking communication of the accounting server on port 80 or with entities beyond the enforcement point (e.g., switch) where the accounting server is coupled. The accounting server may thus be restricted from communicating only with other devices that are communicatively coupled to the same enforcement point (e.g., switch).

In some embodiments, the current access rules of the network device may be accessed and used to determine the access rules to be applied to the entities (e.g., block 322). For example, if an access rule is accessed from an enforcement point that blocks a printer from communicating with IoT devices but an access rule that blocks the printer from communicating with VOIP is not present on the enforcement point, then an access rule that blocks the printer from accessing VOIP devices may be added to access rules to be assigned or configured on the enforcement point.

At block 320, clusters and any anomalies are displayed. The clusters may be displayed in a variety of views including in the manners shown in FIG. 4-6, including the communication matrix of FIG. 6. Various color patterns can be applied to color entities of a cluster and entities that are anomalously located in a cluster (e.g., an IP camera in a smartphone cluster due to behaving like a smartphone).

At block 322, one or more actions are performed. The action may include restricting network access of one or more entities or one or more clusters (e.g., by configuring a network device to limit network access of the one or more entities or one or more cluster), a notification may be sent (e.g., indicating an anomaly has been detected, new clusters have been determined, etc.), and the VLAN of one or more entities or one or more clusters may be changed. The action may further include gathering information about an anomalous entity or cluster (e.g., determining a particular device model, serial number, etc.), and performing administrative tasks (e.g., updating the software of the device, etc.).

One or more policies may be accessed and any of the one or more policies that apply based on the one or more aspects of an entity can be accessed. For example, a policy can be accessed based on the operating system of the entity such that a policy specific to the particular operating system of the entity is accessed.

In some embodiments, one or more enforcement points closest to the entity are determined (e.g., to be used for segmentation). The determination may be based on data associated with the enforcement point closest to the entity. The data associated with the enforcement point (e.g., switch, wireless access point, etc.) may be a cache or other store of the network device or enforcement point that includes a MAC address, an IP address, or other information associated with the entity. For example, the determination may be based on the MAC address, IP address, or combination thereof being associated with a port of a switch device where the entity is communicatively coupled. In some embodiments, access rules (e.g., ACLs) can be applied to more than the connecting network entity where an entity is directly connected. For example, an access rules, e.g., ACL, can be applied to a higher hierarchy switch or to a centralized controller (e.g., a wireless controller).

In some embodiment, the one or more enforcement actions or access rules are assigned to the enforcement point associated with the entity (e.g., the enforcement point closest to the entity, for instance, the network device where the entity is communicatively coupled to the network). The access rules may be determined based on the access policy, e.g., preventing communication beyond an enforcement point, restricting the ports or protocols that may be used, etc. Embodiments may use an application programming interface (API) or a command line interface (CLI), simple network management protocol (SNMP) interface, etc., to assign, configure, or a combination thereof to assign or configure the access rules to the one or more enforcement points.

For example, if an entity is a Windows™ device on a third floor, the device will be determined to have a third floor location, and the enforcement points on the third floor are configured (e.g., via ACLs) to allow the device to communicate with resources available to a device on the third floor (e.g., servers, printers, data center, etc., on the third floor). A compliance characteristic could be determined based on being compliant with a compliance policy (e.g., anti-virus definitions are up to date, no malware is present on the device, operating system and application patches applied or updated, etc.). If the device is found to be non-compliant, e.g., after failing an anti-virus scan, a non-complaint anti-virus characteristic may be determined, which causes the enforcement points to be configured based on the access rules to only allow the device to communicate with anti-virus definitions or updates servers or substantially restrict communication thereto.

Block 302 may then be performed as part of a continuous, real-time, or combination thereof monitoring of the network to dynamically determine and update clusters and detect anomalies. Block 302 may also be performed each time an entity is communicatively coupled to the network (e.g., new devices and returning devices) so a cluster for that entity can be determined.

While example GUIs 400-500 of FIGS. 4-6 may be described with respect to devices or device groups, embodiments support other entities (e.g., users, services, etc.). GUIs 400-600 may be rendered or displayed by a device (e.g., a network monitor entity, for instance, network monitor device 102 or network monitor device 280).

FIG. 4 depicts a diagram of aspects of an example graphical user interface for viewing clusters of entities including a potentially anomalous cluster in accordance with one implementation of the present disclosure. FIG. 4 depicts clusters of entities based on behavior or other aspects and an (potentially) anomalous cluster of just two entities that are exhibiting distinct traffic behavior compared to other clusters. The axes of FIG. 4 are the scores of the features used for clustering. The entities close to each other have similar scores which means that entities close to each other are more similar than to other entities (e.g., entities farther away). The axes in FIG. 4 may represent principal components, of a principle component analysis (PCA), which capture the most variation in the data. Principal component analysis (PCA) is a statistical procedure that uses an orthogonal transformation to convert a set of observations of possibly correlated variables (e.g., entities each of which takes on various numerical values) into a set of values of linearly uncorrelated variables called principal components. The potentially anomalous cluster may have a different color (e.g., red) to highlight the potentially anomalous cluster. Example graphical user interface (GUI) 400 is configured for viewing clusters of entities, anomalies, and anomalous clusters. Each dot or circle of example GUI 400 represents an entity.

The clustering determinations allow clusters of entities to be visually depicted and outliers or anomalies in each cluster to be marked visually as shown in FIG. 4. For example, a cluster with just two devices with abnormal network behavior may be colored a separate color (e.g., red) to highlight the cluster. A quick determination of such anomalous behavior reduces the burden of a user (e.g., administrator) to manually go through each cell in a communication matrix and makes the problem much more tractable.

Example GUI 400 includes clusters 402-410. Clusters 402-410 are clusters that have been identified using the techniques described herein. For example, clusters 402-410 are clusters of entities that have similar behavior and have been clustered accordingly. In some embodiments, each of the entities of clusters 402-406 are colored a single color (e.g., blue) while anomalous cluster 410 is colored a different color (e.g., red).

Cluster 410 is a cluster that has been identified as a potentially anomalous cluster, e.g., behaving unlike the other clusters and optionally having a comparatively small number of entities. For example, the two entities of the anomalous cluster could be rogue devices establishing lots of connections to devices or flooding one or more networks with traffic. It is also possible that the entities of the cluster 410 are highly specialized entities that behave different because of their specialized function. For example, the two entities could be power generation units that are communicatively coupled the internet for remote monitoring.

FIG. 5 depicts a diagram of aspects of an example graphical user interface for viewing clusters of entities including an anomalous entity in accordance with one implementation of the present disclosure. FIG. 5 depicts the coloring of entities in each cluster to allow quick identification of one or more entities that in a cluster with other entities that differ in some manner (e.g., device type or other property or other aspect). The axes of FIG. 5 are the scores of the features used for clustering. The entities close to each other have similar scores which means that entities close to each other are more similar than to other entities (e.g., entities farther away). The axes in FIG. 4 may represent principal components, of a principle component analysis (PCA), which capture the most variation in the data. Principal component analysis (PCA) is a statistical procedure that uses an orthogonal transformation to convert a set of observations of possibly correlated variables (e.g., entities each of which takes on various numerical values) into a set of values of linearly uncorrelated variables called principal components. Example graphical user interface (GUI) 500 is configured for viewing clusters of entities, anomalies, and anomalies within one or more clusters. Each circle or dot of example GUI 500 represents an entity.

Example GUI 500 includes clusters 502-508. Clusters 502-508 are clusters that have been identified using the techniques described herein. For example, clusters 502-508 are clusters of entities that have similar behavior and have been clustered accordingly. Example user interface 500 shows the clusters of entities colored according to their cluster (e.g., which may be based on entity type, group, segment, or subnet, etc.). For example, entities of cluster 504 may be yellow, entities of cluster 506 may be red, and entities of cluster 508 may be green. The clusters are based on behavior or traffic, properties, or other aspects, as described herein. Entities of cluster 502 may be blue but for anomalous entity 520 which is red. The red dot 520 in the upper right of cluster 502 shows that there is an anomaly in that entity as compared to the other entities of cluster 502 (e.g., in one or more aspects). For instance, if the entities of 506 are printers represented by red dots and most of the entities of cluster 502 are smartphones represented by blue dots, the anomalous red dot 520 in the cluster 502 represents a printer exhibiting anomalous network behavior (e.g., acting like a smartphone) which the user or administrator can quickly zero in on.

In some embodiments, a purity score may be shown for each cluster. The purity score can indicate how similar aspects (e.g., behavior, properties, security information, etc.) of entities are with respect to each other. Purity can be defined as a measure of the degree to which each of the entities are similar to other entities in the cluster (e.g., how close a particular entity's behavior is to being a printer). In some embodiments, Cluster purity is a measure of the extent to which clusters contain a single class (e.g., a single class of behavior(s)). The calculation of cluster purity can include for each cluster, count the number of data points (e.g., data points representing entities) from the most common class in the cluster and take the sum (e.g., count) of each cluster over all clusters divided by the total number of data points. Given some set of clusters M and some set of classes D, both partitioning N data points (e.g., with N data points spread across M clusters and D classes), where m is cluster of the set of clusters M and d is a class of the set of classes D, cluster purity can be defined as:

$$\frac{1}{N} \sum_{m \in M} \max_{d \in D} |m \cap d|$$

In various embodiments, a distance score may be determined in association with each entity. The distance score of an entity may be computed based on the distance of an entity to a cluster subtracted by the average distance of entities within a cluster. The distance of an individual entity can be compared to a threshold to determine if the individual entity is an anomaly. The distance score can reflect how far from the expected cluster an entity is. For example, a printer represented by dot 520 is a large distance from the clusters of printers 506.

In some embodiments, a cluster purity score may be based on a distance from other clusters. In some embodiments, an anomaly score of an entity may be determined as a function of the size of the cluster in which the entity belongs and the entity's distance to the center of the other clusters. Many standard anomaly detection techniques which may be applied by various embodiments (e.g., using outlier detection methodologies and statistical modeling techniques, including Z-scores, extreme value analysis, DB SCAN, Isolation Forest, Local Outlier Factor, etc.).

FIG. 6 depicts a diagram of aspects of an example graphical user interface including a matrix of communications between clusters of entities in accordance with one implementation of the present disclosure. Example graphical user interface (GUI) 600 is configured for viewing communications between clusters, the volume of traffic between clusters, and whether anomalies have been determined in association with communications between clusters. Each dot or circle of example GUI 600 represents communication between two clusters.

Example GUI 600 shows a matrix of communications between clusters with dots sized according to the volume or amount of data or communications and other attributes based on the communications (e.g., with anomalous communications colored in a different color). Actions can then be taken based on the matrix (e.g., by selecting the dot at the intersections of the rows and column of the matrix). For example, traffic from one cluster to another can be blocked (e.g., cluster 1 to cluster 3 communications).

The matrix includes column 602 representing clusters as a destination of communications and row 604 representing clusters as a source of communications. Each intersection of the matrix represents communications between a source cluster in a row and a destination cluster in a column. If an intersection is blank that can indicate that there are no communications between the clusters that are associated with the intersection. In some embodiments, a threshold amount of communication, which may be user configured, may be used to configure the matrix for viewing communications above the threshold. This can allow a user to focus in on the large communications volumes between clusters as communications between clusters that are below the threshold are not shown (or could be shown in a different color).

The dot or circle 606 at the intersection of the row associated with source as cluster 1 and the destination as cluster 1 represents the traffic within cluster 1 (e.g., among the entities in cluster 1). The circle 608 at the intersection of the row for source cluster 3 and column for destination cluster 2 represents the amount of traffic or volume going to cluster 2 from cluster 3.

The circle 610 at the intersection of the row for source cluster 1 and column for destination cluster 3 represents the amount of traffic or volume going from cluster 1 to cluster 3. The circle 610 may be colored (e.g., red) to indicate that there is anomalous communication occurring from cluster 1 to cluster 3. A user may select circle 610 to get more details and optionally initiates one or more actions, as described herein. Circles 606-608 and other circles of the matrix may be colored (e.g., blue) to represent that the communications between the associated clusters have not been determined to include anomalous communications.

Figure 7:
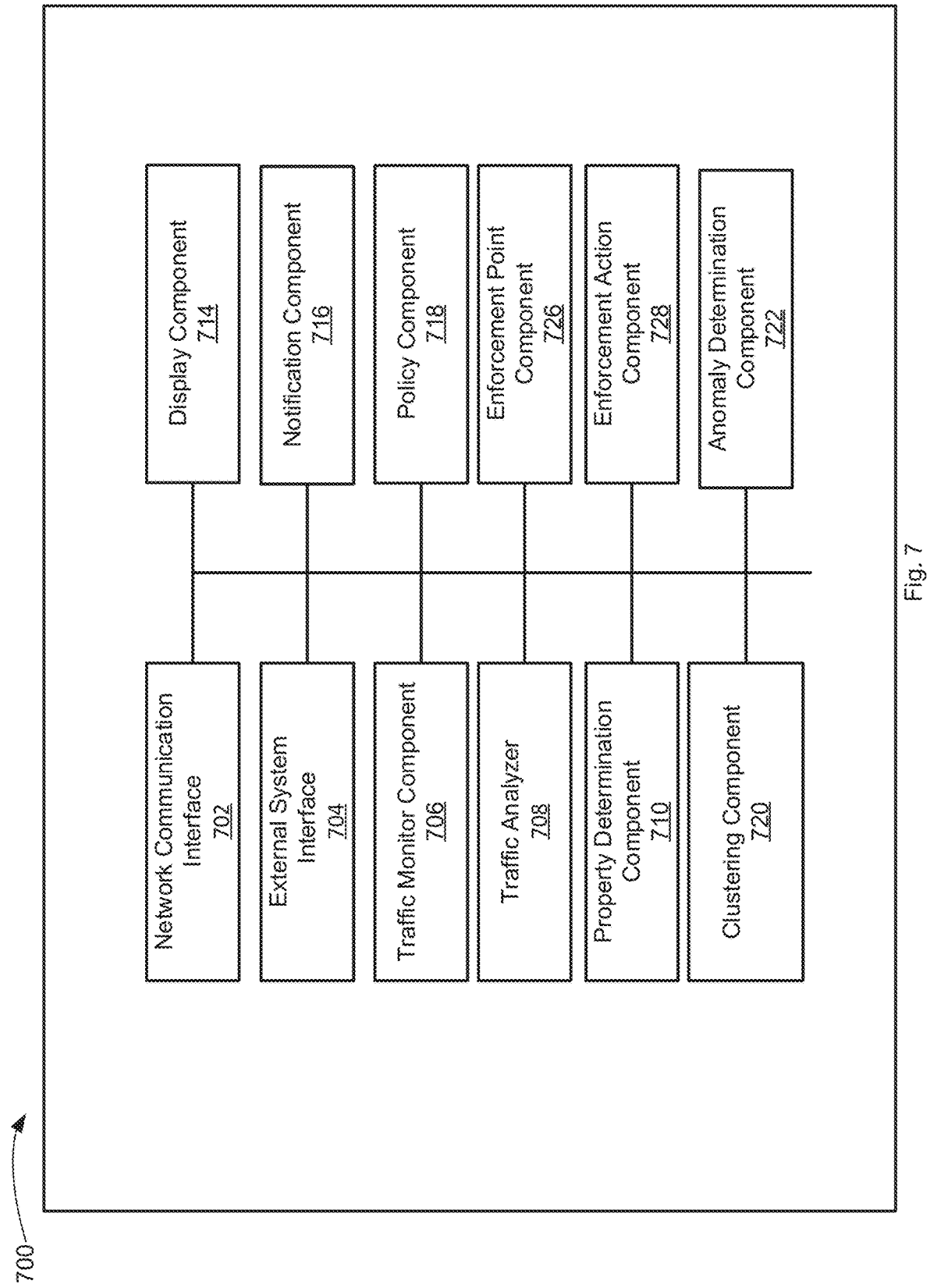
FIG. 7 depicts illustrative components of a system for determining one or more clusters of entities in accordance with one implementation of the present disclosure.

FIG. 7 illustrates example components used by various embodiments. Although specific components are disclosed in system 700, it should be appreciated that such components are examples. That is, embodiments are well suited to having various other components or variations of the components recited in system 700. It is appreciated that the components in system 700 may operate with other components than those presented, and that not all of the components of system 700 may be required to achieve the goals of system 700.

FIG. 7 depicts illustrative components of a system for determining one or more clusters of entities in accordance with one implementation of the present disclosure. Example system 700 or access manager 700 includes a network communication interface 702, an external system interface 704, a traffic monitor component 706, a traffic analyzer 708, a property determination component 710, a display component 714, a notification component 716, a policy component 718, a clustering component 720, an anomaly detection component 722, enforcement point component 726, and enforcement action component 728. The components of system 700 may be part of a computing system or other electronic device (e.g., network monitor device 102 or network monitor device 280) or a virtual machine or device and be operable to monitor and one or more entities communicatively coupled to a network, monitor network traffic, determine clusters, determine anomalies, perform one or more actions, and configure or assign access rules on one or more enforcement points, as described herein. For example, the system 700 may further include a memory and a processing device, operatively coupled to the memory, which may perform the operations of or execute the components of system 700. The components of system 700 may access various data and characteristics or properties associated with an entity (e.g., network communication information) and data associated with one or more entities. It is appreciated that the modular nature of system 700 may allow the components to be independent and allow flexibility to enable or disable individual components or to extend, upgrade, or combination thereof components without affecting other components thereby providing scalability and extensibility. System 700 may perform one or more blocks of flow diagram 300. In some embodiments the components of 700 may be part of network monitor entity (e.g., network monitor devices 102 and 280), in the cloud, or the various components may be distributed between local and cloud resources.

Communication interface 702 is operable to communicate with one or more entities (e.g., network device 104, firewalls 202-206, switches 210 and 220-226, other devices coupled thereto, devices 230-262, etc.) coupled to a network that are coupled to system 700 and receive or access information about entities (e.g., entity communications, entity properties, etc.), access policies, segmentation policies, and access rules (e.g., from one or more enforcement points), as described herein. The communication interface 702 may be operable to work with one or more components to initiate access to characteristics or determination of properties of an entity to allow determination of a classification or enable one or more properties to be used for clustering, as described herein. Communication interface 702 may be used to receive and store network traffic for behavior analysis, properties analysis, anomaly analysis, etc., as described herein.

External system interface 704 is operable to communicate with one or more third party, remote, or external systems to access information including characteristics or properties about an entity (e.g., to be used to determine a security aspects). External system interface 704 may further store the accessed information in a data store. For example, external system interface 704 may access information from a vulnerability assessment (VA) system to enable determination of one or more compliance or risk characteristics associated with the entity. External system interface 704 may be operable to communicate with a vulnerability assessment (VA) system, an advanced threat detection (ATD) system, a mobile device management (MDM) system, a firewall (FW) system, a switch system, an access point (AP) system, etc. External system interface 704 may query a third party system using an API or CLI. For example, external system interface 704 may query a firewall or a switch for information (e.g., network session information) about an entity or for a list of entities that are communicatively coupled to the firewall or switch and communications associated therewith. In some embodiments, external system interface 704 may query a switch, a firewall, or other system for information of communications associated with an entity.

Traffic monitor component 706 is operable to monitor network traffic to determine if a new entity has joined the network or an entity has rejoined the network and monitor traffic for analysis by traffic analyzer 708, as described herein.

Traffic analyzer 708 is configured to perform analysis of network traffic (e.g., in real-time, with machine learning, etc.) to and from an entity thereby providing analysis of end to end communications of an entity (e.g., including determining a connection map or sources and destinations of one or more communications), as described herein. Traffic analyzer 708 may determine one or more properties and associated values associated with an entity based on analysis (e.g., including extraction of properties and values) of network traffic, as described herein. Traffic analyzer 708 may further be able to determine one or more enforcement points that are closest to an entity (e.g., based on connection hops between an entity and network monitor device 280), as described herein. Traffic analyzer 708 may have a packet engine operable to access packets of network traffic (e.g., passively) and analyze the network traffic. The traffic analyzer 708 may be configured to perform active or passive traffic analysis or a combination thereof. The traffic analyzer 708 may further be able to access and analyze traffic logs from one or more entities (e.g., network device 104, system 150, or aggregation device 106) or from an entity being monitored. The traffic analyzer 708 may further be able to access traffic analysis data associated with an entity being monitored, e.g., where the traffic analysis is performed by a third party system. Information of traffic analyzer 708 may be stored, displayed, and used as a basis for cluster determination, anomaly determination, access rule determination configuration, verification, or the like, as described herein.

Property determination component 710 is configured to determine one or more properties associated with an entity, as described herein. The properties can then be stored and used by other components (e.g., clustering component 720, anomaly detection component 722) for performing clustering, anomaly detection, and performing actions, as described herein.

Clustering component 720 is configured to determine one or more clusters based on various aspects (e.g., behavior, properties, classification, security risk, vulnerabilities, etc.) associated with one or more entities communicatively coupled with a network, as described herein.

Anomaly detection component 722 is configured to determine anomalies of entities in the one or more clusters, as described herein. The anomalies may be determined based on comparing various aspects (e.g., behavior, properties, classification, security risk, vulnerabilities, etc.) of entities relative to clusters and other entities, as described herein.

Display component 714 is configured to optionally display one or more graphical user interfaces or other interfaces (e.g., command line interface) for depicting various information associated with entities, clusters, anomalies, and communications (e.g., FIGS. 4-6), as described herein. In some embodiments, display component 714 may display or render a network graph of entities, access rules associated with entities, and other access rule information (e.g., access policies, access templates, etc.).

Notification component 716 is operable to initiate one or more notifications based on the results of determining clusters, anomalies, and other analysis of communications, as described herein. The notification may be any of a variety of notifications, e.g., IT ticket, email, SMS, a HTTP notification, etc., as described herein.

Policy component 718 is operable for initiating or triggering one or more remediation actions or security actions according to one or more policies, e.g., based on an anomaly, as described herein. Policy component 718 may further be configured to perform other operations including checking compliance status, finding open ports, etc. In some embodiments, policy component 718 may verify that an assignment of one or more access rules to one or more enforcements points has been properly assigned or configured. Policy component 718 may restrict network access, signal a patch system or service, signal an update system or service, etc., as described herein. The policy component 718 may thus, among other things, invoke automatically (e.g., without user or human interaction) patching, automatically updating, and automatically restrict network access of an entity (e.g., that has out-of-date software or based on access rule violation or attempted violation).

The actions may include restricting network access to a particular level (e.g., full, limited, or no network access), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

Enforcement point component 726 is configured to determine one or more enforcement points (e.g., network devices) associated with an entity or within one or more networks, as described herein. For example, enforcement point component 726 may determine the enforcement point where an entity is communicatively coupled to a network (e.g., the enforcement point closest to the entity). In some embodiments, enforcement point component 726 is further configured to access or request configuration information from enforcement points which may then be used to determine an access policy, as described herein. In some embodiments, policy component 718 is configured to determine one or more segmentation rules based on one or more clusters and one or more anomalies, as described herein.

Enforcement action component 728 is configured to assign one or more enforcement actions or access rules (e.g., based on determinations by enforcement point component 726) to one or more enforcement points associated with an entity, as described herein. Enforcement action component 728 is further configured to translate a generic access policy for an entity or cluster into configuration information (e.g., customized information or commands for a switch or firewall ACL) for one or more enforcement points of a network. Enforcement action component 728 may further be configured to apply or communicate the configuration information to the enforcement points, as described herein. In some embodiments, enforcement action component 728 may act as a controller of the enforcement points of a network (e.g., a software defined controller).

The system 700 may be software stored on a non-transitory computer readable medium having instructions encoded thereon that, when executed by a processing device, cause the processing device to access network traffic from a network. The network traffic may be associated with a plurality of entities. The instructions may further cause the processing device to determine behavior associated with each entity of the plurality of entities. The behavior may be determined based one or more communications associated with each entity. The instructions may further cause the processing device to determine, with a processing device, one or more clusters of entities based on entities having similar behavior. A cluster may comprise one or more entities with similar behavior. The instructions may further cause the processing device to determine one or more anomalies based on the one or more clusters and store data associated with at least one of the one or more clusters and the one or more anomalies.

In some embodiments, the instructions may further cause the processing device to perform an action associated with at least one entity of a cluster. In various embodiments, the one or more clusters are further determined based on at least one of a property of the one or more entities of a cluster of the one or more clusters. In some embodiments, at least one cluster is determined based on a classification and the classification is based on one or more properties associated with the one or more entities.

In various embodiments, the behavior of at least one entity is determined using at least one of machine learning, graph based clustering, or community detection. In some embodiments, an anomaly comprises one or more unusual communications of an entity as compared to other similar entities. In various embodiments, the determination of clusters is further based on user input. In some embodiments, the instructions may further cause the processing device to determine one or more segments based on the one or more clusters. In some embodiments, the instructions may further cause the processing device to determine one or more polices associated with at least one entity of the one or more clusters. In various embodiments, the instructions may further cause the processing device to determining a data structure comprising communication between each of the one or more clusters and at least one of a volume of traffic between each of the one or more clusters or whether an anomaly is associated with communication between a first cluster and a second cluster.

Figure 8:
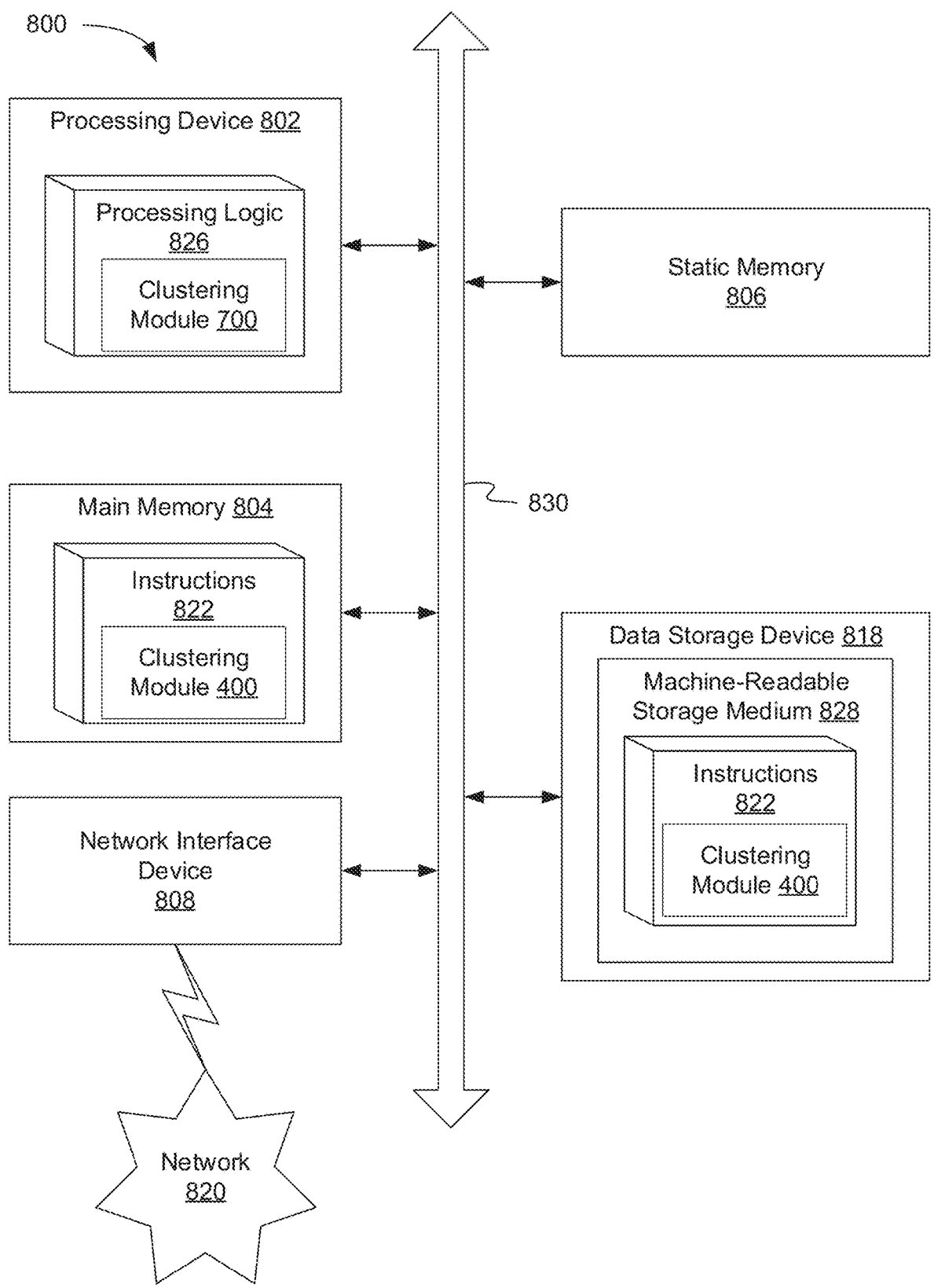
FIG. 8 is a block diagram illustrating an example computer system, in accordance with one implementation of the present disclosure.

FIG. 8 illustrates a diagrammatic representation of a machine in the example form of a computer system 800 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 800 may be representative of a server, such as network monitor device 102 running clustering module 700 to perform cluster and anomaly determination including determining one or more clusters associated with one or more entities (e.g., based on entity behavior), determining one or more anomalies, storing data associated with the clusters and anomalies, and performing an actions associated with an entity of a cluster, as described herein.

The exemplary computer system 800 includes a processing device 802, a main memory 804 (e.g., read-only memory (ROM), flash memory, dynamic random access memory (DRAM), a static memory 806 (e.g., flash memory, static random access memory (SRAM), etc.), and a data storage device 818, which communicate with each other via a bus 830. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute processing logic 826, which may be one example of clustering module 700 shown in FIG. 7, for performing the operations and steps discussed herein.

The data storage device 818 may include a machine-readable storage medium 828, on which is stored one or more set of instructions 822 (e.g., software) embodying any one or more of the methodologies of operations described herein, including instructions to cause the processing device 802 to execute clustering module 700. The instructions 822 may also reside, completely or at least partially, within the main memory 804 or within the processing device 802 during execution thereof by the computer system 800; the main memory 804 and the processing device 802 also constituting machine-readable storage media. The instructions 822 may further be transmitted or received over a network 820 via the network interface device 808.

The machine-readable storage medium 828 may also be used to store instructions to perform a method for determining clusters and anomalies, as described herein. While the machine-readable storage medium 828 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   accessing network traffic from a network, wherein the network traffic is associated with a plurality of entities;
   determining behavior associated with each entity of the plurality of entities, wherein the behavior is determined based on one or more communications associated with each entity;
   determining, by a processing device, one or more clusters of entities based on entities having similar behavior, wherein a cluster comprises one or more entities with similar behavior;
   determining one or more access policies associated with each of the one or more clusters of entities;
   determining one or more anomalies based on the one or more clusters, wherein the one or more access policies control communications between entities of the one or more clusters based on the one or more anomalies; and
   storing data associated with at least one of the one or more clusters and the one or more anomalies.

2. The method of claim 1 further comprising:
   performing an action associated with at least one entity of a cluster.

3. The method of claim 1, wherein the one or more clusters are further determined based on at least one of a property of the one or more entities of a cluster of the one or more clusters.

4. The method of claim 3, wherein at least one cluster is determined based on a classification, wherein the classification is based on one or more properties associated with the one or more entities.

5. The method of claim 1, wherein the behavior of at least one entity is determined using at least one of machine learning, graph based clustering, or community detection.

6. The method of claim 1, wherein an anomaly comprises one or more unusual communications of an entity as compared to other similar entities.

7. The method of claim 1, wherein the determining of clusters is further based on user input.

8. The method of claim 1 further comprising:
   determining one or more segments based on the one or more clusters.

9. The method of claim 1 further comprising:
   determining one or more polices associated with at least one entity of the one or more clusters.

10. The method of claim 1 further comprising:
    determining a data structure comprising communication between each of the one or more clusters and at least one of a volume of traffic between each of the one or more clusters or whether an anomaly is associated with communication between a first cluster and a second cluster.

11. A system comprising:
    a memory; and
    a processing device, operatively coupled to the memory, to:
    access network traffic from a network, wherein the network traffic is associated with a plurality of entities;
    determine behavior associated with each entity of the plurality of entities, wherein the behavior is determined based on one or more communications associated with each entity;
    determine one or more clusters of entities based on entities having similar behavior, wherein a cluster comprises one or more entities with similar behavior;
    determine one or more access policies associated with each of the one or more clusters of entities;
    determine one or more anomalies based on the one or more clusters, wherein the one or more access policies control communications between entities of the one or more clusters based on the one or more anomalies; and
    store data associated with at least one of the one or more clusters and the one or more anomalies.

12. The system of claim 11, the processing device further to:
    perform an action associated with at least one entity of a cluster.

13. The system of claim 11, wherein the one or more clusters are further determined based on at least one of a property of the one or more entities of a cluster of the one or more clusters.

14. The system of claim 13, wherein the behavior of at least one entity is determined using at least one of machine learning, graph based clustering, or community detection.

15. The system of claim 13, wherein an anomaly comprises one or more unusual communications of an entity as compared to other similar entities.

16. The system of claim 13, the processing device further to:
    determine one or more segments based on the one or more clusters.

17. The system of claim 13, the processing device further to:
    determine a data structure comprising communication between each of the one or more clusters and at least one of a volume of traffic between each of the one or more clusters or whether an anomaly is associated with communication between a first cluster and a second cluster.

18. A non-transitory computer readable medium having instructions encoded thereon that, when executed by a processing device, cause the processing device to:
    access network traffic from a network, wherein the network traffic is associated with a plurality of entities;
    determine behavior associated with each entity of the plurality of entities, wherein the behavior is determined based on one or more communications associated with each entity;

determine, by the processing device, one or more clusters of entities based on entities having similar behavior, wherein a cluster comprises one or more entities with similar behavior;

determine one or more access policies associated with each of the one or more clusters of entities;

determine one or more anomalies based on the one or more clusters, wherein the one or more access policies control communications between entities of the one or more clusters based on the one or more anomalies; and store data associated with at least one of the one or more clusters and the one or more anomalies.

19. The non-transitory computer readable medium of claim 18, wherein the instructions further cause the processing device to:

perform an action associated with at least one entity of a cluster.

20. The non-transitory computer readable medium of claim 18, wherein an anomaly comprises one or more unusual communications of an entity as compared to other similar entities.

* * * * *